(12) United States Patent
Katayama

(10) Patent No.: US 6,957,635 B2
(45) Date of Patent: Oct. 25, 2005

(54) VALVE TIMING CONTROL FOR MARINE ENGINE

(75) Inventor: Goichi Katayama, Shizuoka (JP)

(73) Assignee: Yamaha Marine Kabushiki Kaisha, Shizuoka (JP)

( * ) Notice: Subject to any disclaimer, the term of this patent is extended or adjusted under 35 U.S.C. 154(b) by 80 days.

(21) Appl. No.: 10/188,772

(22) Filed: Jul. 1, 2002

(65) Prior Publication Data

US 2004/0206321 A1 Oct. 21, 2004

(30) Foreign Application Priority Data

Jun. 29, 2001 (JP) ........................................ 2001-199088

(51) Int. Cl.$^7$ ................................................ F01L 1/34
(52) U.S. Cl. ............................... 123/90.17; 123/90.15; 74/568 R
(58) Field of Search ................. 123/90.15–90.17; 74/568 R; 464/1, 2, 160; 92/121, 122

(56) References Cited

U.S. PATENT DOCUMENTS

| | | |
|---|---|---|
| 5,012,773 A | 5/1991 | Akasaka et al. |
| 5,058,539 A | 10/1991 | Saito et al. |
| 5,111,780 A | 5/1992 | Hannibal |
| 5,133,310 A | 7/1992 | Hitomi et al. |
| 5,143,034 A | 9/1992 | Hirose |
| 5,150,675 A | 9/1992 | Murata |
| 5,184,581 A | 2/1993 | Aoyama et al. |
| 5,189,999 A | 3/1993 | Thoma |
| 5,301,639 A | 4/1994 | Satou |
| 5,305,718 A | 4/1994 | Muller |
| 5,353,755 A | 10/1994 | Matsuo et al. |
| 5,458,099 A | 10/1995 | Koller et al. |
| 5,474,038 A | 12/1995 | Golovatai-Schmidt et al. |
| 5,540,197 A | 7/1996 | Golovatai-Schmidt et al. |
| 5,606,941 A | 3/1997 | Trzmiel et al. |
| 5,606,952 A | 3/1997 | Kanno et al. |
| 5,611,304 A * | 3/1997 | Shinojima ................. 123/90.15 |
| 5,626,108 A * | 5/1997 | Kato et al. ................ 123/90.15 |

(Continued)

FOREIGN PATENT DOCUMENTS

| | | |
|---|---|---|
| EP | 0 356 162 A1 | 2/1990 |
| EP | 0 699 831 A2 | 3/1996 |
| EP | 0 808 997 A1 | 11/1997 |
| EP | 0 829 621 A2 | 3/1998 |

OTHER PUBLICATIONS

Co–pending Application No. 10/078,275, entitled Control System for Marine Engine, filed on Feb. 14, 2002 in the name of Isao Kanno and assigned to Sanshin Kogyo Kabushiki Kaisha.

*Primary Examiner*—Thomas Denion
*Assistant Examiner*—Jaime Corrigan
(74) *Attorney, Agent, or Firm*—Knobbe, Martens, Olson & Bear, LLP

(57) ABSTRACT

An engine for a marine drive has a combustion chamber. An engine body of the engine defines intake and exhaust ports communicating with the combustion chamber. An air induction system communicates with the combustion chamber through intake ports. An exhaust system communicates with the combustion chamber through the exhaust ports. Intake valves move between an opening position and a closing position of the intake ports. Exhaust valves move between an opening position and a closing position of the exhaust ports. Camshafts actuate the intake and the exhaust valves. A hydraulic VVT mechanism changes an actuating timing of the camshaft at which the camshaft actuates the intake valves or the exhaust valves. An ECU controls the VVT mechanism based upon a control characteristic. A temperature sensor, such as an oil temperature sensor, a water temperature sensor and an engine body temperature sensor, senses a temperature of oil of the VVT or a temperature relating to the temperature of the oil and sends a temperature signal to the ECU. The ECU adjusts the control characteristic when the temperature is lower than a preset temperature.

33 Claims, 9 Drawing Sheets

U.S. PATENT DOCUMENTS

| | | | |
|---|---|---|---|
| 5,626,109 A | * 5/1997 | Yasumura et al. | 123/90.15 |
| 5,628,286 A | * 5/1997 | Kato et al. | 123/90.15 |
| 5,669,343 A | 9/1997 | Adachi | |
| 5,694,912 A | * 12/1997 | Gotou et al. | 123/674 |
| 5,713,319 A | 2/1998 | Tortul | |
| 5,715,779 A | * 2/1998 | Kato et al. | 123/90.15 |
| 5,718,196 A | 2/1998 | Uchiyama et al. | |
| 5,758,612 A | 6/1998 | Tsuzuku et al. | |
| 5,797,363 A | 8/1998 | Nakamura | |
| 5,799,631 A | 9/1998 | Nakamura | |
| 5,813,377 A | 9/1998 | Matsunaga | |
| 5,826,560 A | 10/1998 | Ito | |
| 5,829,399 A | 11/1998 | Scheidt et al. | |
| 5,836,274 A | 11/1998 | Saito et al. | |
| 5,855,190 A | 1/1999 | Matsunaga | |
| 5,913,298 A | 6/1999 | Yoshikawa | |
| 5,937,806 A | * 8/1999 | Lyko et al. | 123/90.15 |
| 5,954,019 A | 9/1999 | Yoshikawa et al. | |
| 5,957,095 A | * 9/1999 | Kako | 123/90.15 |
| 6,015,319 A | 1/2000 | Tanaka | |
| 6,032,623 A | * 3/2000 | Yamagishi et al. | 123/90.15 |
| 6,032,629 A | 3/2000 | Uchida | |
| 6,035,817 A | 3/2000 | Uchida | |
| 6,076,492 A | 6/2000 | Takahashi | |
| 6,079,381 A | * 6/2000 | Morikawa | 123/90.15 |
| 6,092,496 A | * 7/2000 | Bhargava et al. | 123/90.15 |
| 6,116,228 A | 9/2000 | Motose et al. | |
| 6,186,105 B1 | 2/2001 | Yonezawa | |
| 6,189,498 B1 | 2/2001 | Yonezawa et al. | |
| 6,250,266 B1 | 6/2001 | Okui et al. | |
| 6,289,861 B1 | 9/2001 | Suzuki | |
| 6,289,862 B1 | * 9/2001 | Schafer et al. | 123/90.17 |
| 6,306,042 B1 | * 10/2001 | Tortul | 464/2 |
| 6,325,031 B1 | 12/2001 | Takano | |
| 6,343,580 B2 | 2/2002 | Uchida | |
| 6,343,581 B2 | 2/2002 | Suzuki | |
| 6,354,277 B1 | 3/2002 | Kato | |
| 6,357,405 B1 | 3/2002 | Tsuji et al. | |
| 2002/0017277 A1 | 2/2002 | Kanno | |

* cited by examiner

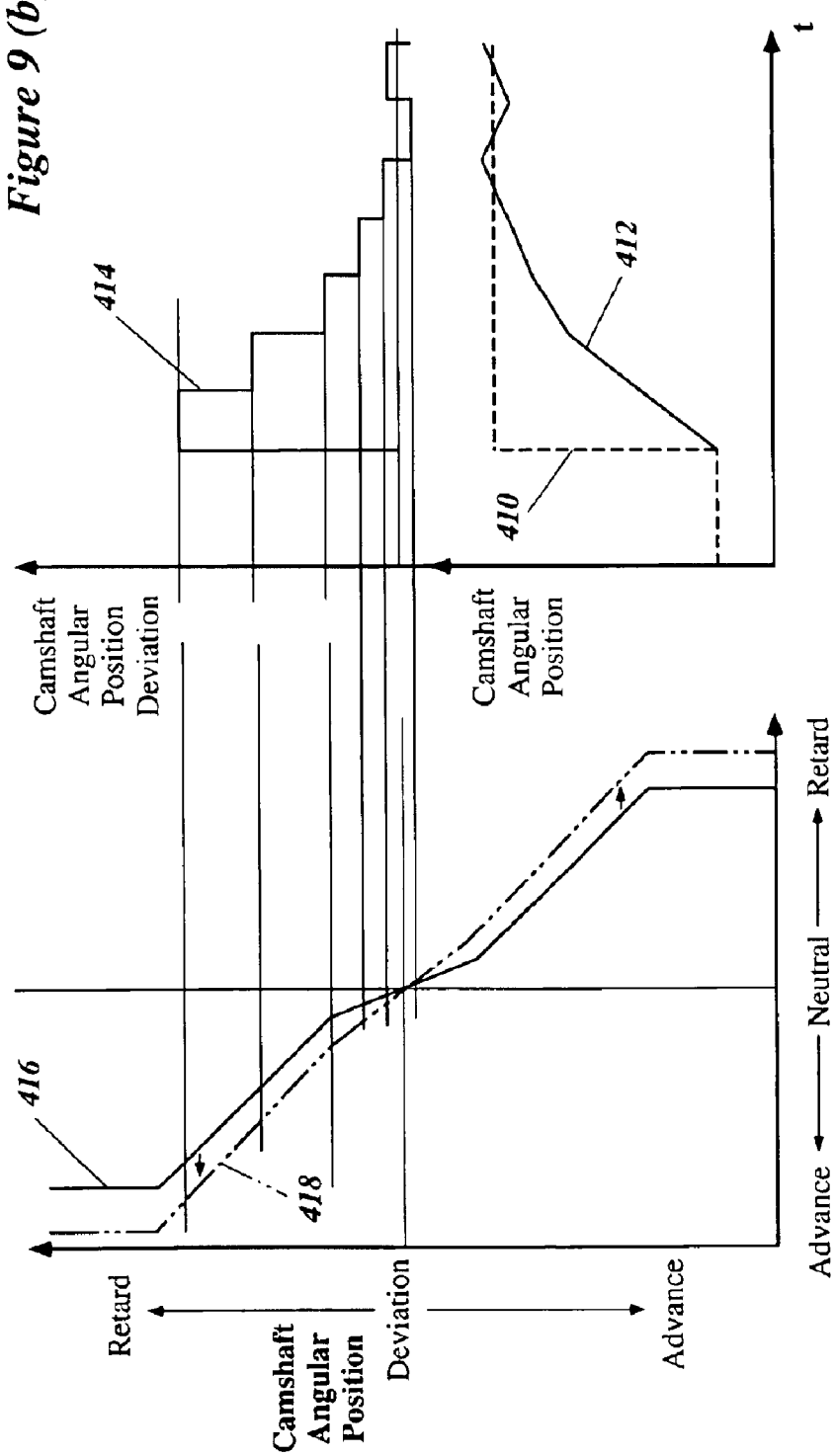

VALVE TIMING CONTROL FOR MARINE ENGINE

PRIORITY INFORMATION

This application is based on and claims priority to Japanese Patent Application No. 2001-199088, filed Jun. 29, 2001, the entire contents of which is hereby expressly incorporated by reference.

BACKGROUND OF THE INVENTION

1. Field of the Invention

The present invention is directed to a valve timing control for an engine, and more particularly to an improved valve timing control for an engine that includes a variable valve timing mechanism.

2. Description of Related Art

Engines, for example, but without limitation, such as those used in marine drives including outboard motors, drive propulsion devices. The propulsion device typically is a propeller and is submerged when an associated watercraft rests on a body of water. The engine can be either a two-cycle engine or a four-cycle engine. Recently, however, many outboard motors have been constructed with four-cycle engines which provide better emission control.

Typically, a four-cycle engine includes one or more intake valves and exhaust valves moving between an open position and a closed position. One or more camshafts can be provided to actuate the valves in a timed manner. With the intake valves opened, air is introduced into combustion chambers of the engine through the intake ports. With the exhaust valves opened, exhaust gases are discharged from the combustion chambers through the exhaust ports.

The engine can include a hydraulically operated variable valve timing (VVT) mechanism that can change opening and closing timing of the respective valves by changing an angular position of the camshaft (or angular positions of the camshafts). A control device such as, for example, an electronic control unit (ECU), is used to control the VVT mechanism under various control strategies. For example, the ECU controls the VVT mechanism to set the valve timing at a fully advanced position for relatively higher engine speeds to ensure high charging efficiency and high performance of the engine. Additionally, the ECU sets the valve timing at a fully retarded position for relatively low engine speeds to ensure high combustion efficiency, fuel economy and good emission control. At other engine speeds, the ECU controls the VVT mechanism to set the valve timing at a position between the fully advanced position and the fully retarded position in response to a running condition of the engine.

SUMMARY OF THE INVENTION

One aspect of the invention includes the realization that the performance of hydraulically operated VVT systems that use oil as a working fluid can be adversely affected if the oil is temperature is sufficiently low. For example, oil has a viscosity which varies with temperature. The higher the temperature, the lower the viscosity. When the viscosity is relatively low, a VVT mechanism can accurately follow the commands issued by the ECU without excessive delay. However, if the viscosity is relatively high, the VVT mechanism reacts more slowly such that a delay is generated after a control signal from the ECU is received by the VVT mechanism. Such a delay can, adversely affect the performance of the engine.

In some arrangements, the VVT mechanism can be isolated from the engine, thereby attenuating the heat transfer between the engine and the VVT mechanism. However, certain applications provide a limited space for the engine, such as in an outboard motor, or the engine compartment of a small watercraft. For example, a typical outboard motor, does not offer any available space other than a location on its own engine body. Therefore, a temperature of the engine, whether high or low, can significantly affect a temperature of the oil of the VVT mechanism.

An engine can be cold if it has not been operated for a significant period of time. Thus, in a cold engine, the oil in the VVT mechanism has high viscosity, which causes the delay noted above until the engine is warmed up. Another aspect of the invention includes the realization that this problem is exacerbated in systems which employ an open-loop cooling system.

For example, marine drives typically employ an open-loop type cooling system to cool the engine body during operation. The cooling system introduces some water from a body of water surrounding the marine drive or an associated watercraft. The water is circulated around a water jacket of the engine and is discharged to a location outside of the marine drive or the watercraft. The water can prevent the engine from being warmed quickly. Thus, the oil in the VVT mechanism can remain cold and remain in the higher viscosity state for an unacceptable amount of time after the engine has been started.

A need therefore exists for an improved valve timing control for a marine drive that can compensate for delays caused by a temperature of the working fluid used in the VVT mechanism.

In accordance with one aspect of the present invention, an internal combustion engine includes an engine body, a movable member movable relative to the engine body, the engine body and the movable member together defining a combustion chamber. The engine body defines intake and exhaust ports communicating with the combustion chamber. An air induction system communicates with the combustion chamber through the intake port. An exhaust system communicates with the combustion chamber through the exhaust port. An intake valve is configured to move between an open position and a closed position of the intake port. An exhaust valve is arranged to move between an open position and a closed position of the exhaust port. A valve actuator is arranged to actuate either the intake valve or the exhaust valve. A hydraulic change mechanism is arranged to change an actuating timing of the valve actuator at which the valve actuator actuates the intake valve or the exhaust valve. A control device is configured to control the change mechanism based upon a control characteristic. A temperature sensor is configured to sense a temperature indicative of the temperature of oil of the change mechanism and to send a temperature signal to the control device. The control device is configured to adjust the control characteristic based upon the temperature signal.

In accordance with another aspect of the present invention, an internal combustion engine for a marine drive comprises an engine body and a movable member movable relative to the engine body. The engine body and the movable member together define a combustion chamber. The engine body defines intake and exhaust ports communicating with the combustion chamber. An air induction system communicates with the combustion chamber through the intake port. An exhaust system communicates with the combustion chamber through the exhaust port. An intake valve is arranged to move between an open position and a closed position of the intake port. An exhaust valve is arranged to move between an open position and a closed position of the exhaust port. A valve actuator is arranged to actuate either the intake valve or the exhaust valve. A hydraulic change mechanism is arranged to change an actuating timing of the valve actuator at which the valve actuator actuates the intake valve or the exhaust valve. A control device is configured to control the change mechanism based upon a control characteristic. The engine body defines a coolant jacket through which coolant flows. A first temperature sensor is configured to sense a temperature of the coolant and to send a first temperature signal to the control device. A second temperature sensor is configured to sense a temperature of the engine body and to send a second temperature signal to the control device. The control device is configured to adjust the control characteristic when the first and second temperature signals sensed by the first and second temperature sensors, respectively, are substantially different from each other.

A further aspect of the invention is directed to a method for controlling an internal combustion engine. The engine includes intake and exhaust valves, a valve actuator configured to actuate the intake and exhaust valves, and a hydraulic change mechanism configured to change an actuating timing of the valve actuator at which the valve actuator actuates at least one of the intake valve and the exhaust valve. The method includes changing the actuating timing based upon a control characteristic, sensing at least one of a temperature of oil of the change mechanism or a temperature relating to the temperature of the oil, and adjusting the control characteristic based upon the sensed temperature.

A still further aspect of the present invention is directed to a method for controlling an internal combustion engine. The engine includes intake and exhaust valves, a valve actuator arranged to actuate the intake and exhaust valves, and a hydraulic change mechanism configured to change an actuating timing of the valve actuator at which the valve actuator actuates at least one of the intake valve and the exhaust valve. The method includes changing the actuating timing based upon a control characteristic, sensing a first temperature of coolant which cools the engine, sensing a second temperature of the engine, determining whether the first and second temperatures are substantially different from each other, and adjusting the control characteristic when the determination is affirmative.

Another aspect of the present invention is directed to an internal combustion engine comprising an engine body. The engine body defines a combustion chamber with at least one valve seat. At least one valve is configured to move between an open position and a closed position of the valve seat. A valve actuator is configured to move the valve between the open and closed positions. A hydraulic adjustment mechanism using an oil as a working fluid is configured to change an actuating timing of the valve actuator at which the valve actuator moves the valve. Additionally, the engine includes means for compensating for temperature fluctuations of the oil.

BRIEF DESCRIPTION OF THE DRAWINGS

These and other features, aspects and advantages of the present invention will now be described with reference to the drawings of several preferred embodiments, which are intended to illustrate and not to limit the invention. The drawings comprise nine figures.

FIGS. 9(a),(b),(c) are graphical views illustrating camshaft angular positions, a camshaft angular deviation between a target camshaft angular position and an actual camshaft angular position, and two control characteristics, respectively, all which relate with each other. The dashed line of FIG. 9(a) illustrates the target camshaft angular position and the solid line of FIG. 9(a) illustrates the actual camshaft angular position. The solid line of FIG. 9(c) illustrates one of the control characteristics applied under a normal running condition of the engine. The phantom line of FIG. 9(c) illustrates another characteristic applied under a warming up condition of the engine.

DETAILED DESCRIPTION OF THE PREFERRED EMBODIMENTS OF THE INVENTION

Figure 1:
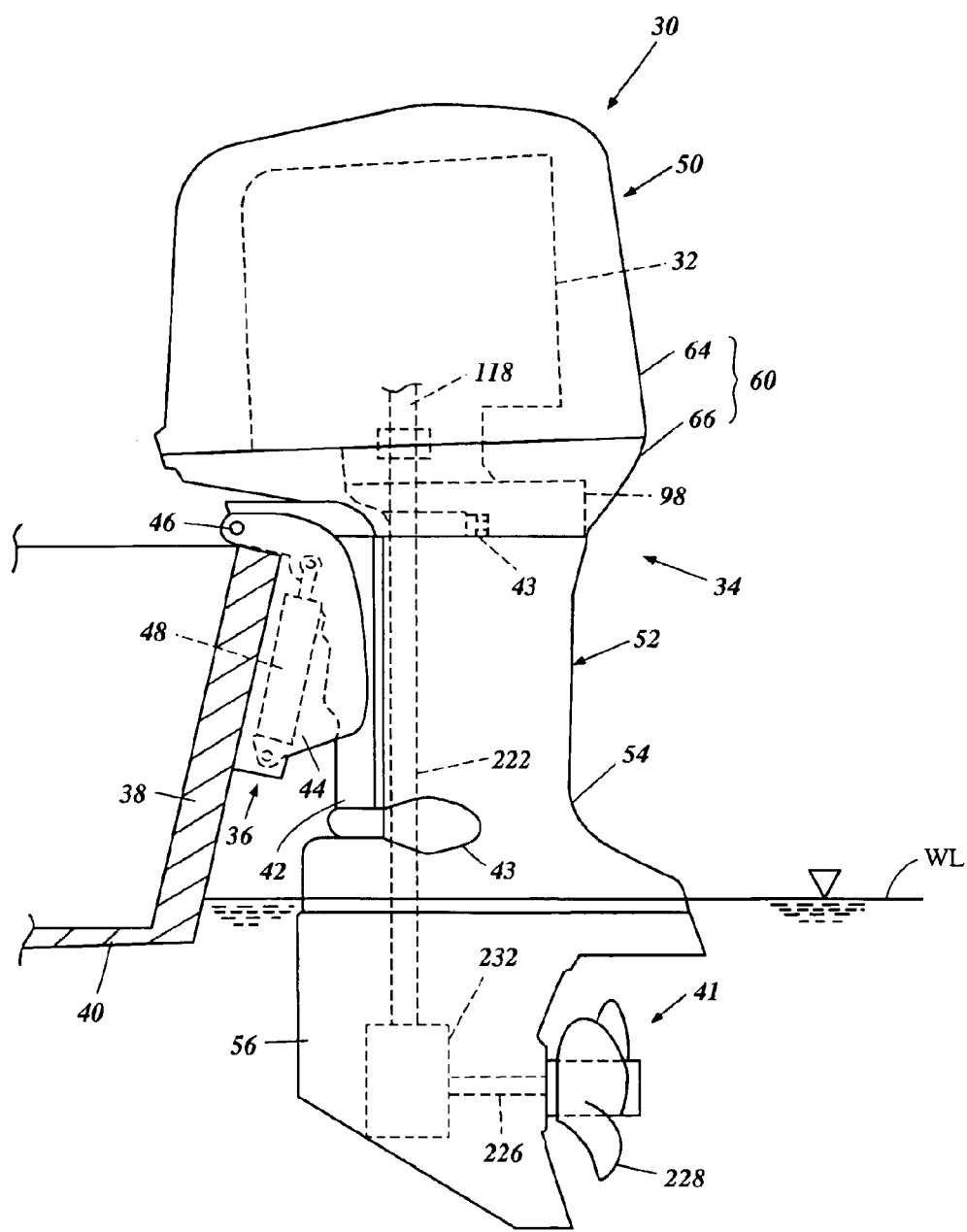
FIG. 1 is a side elevational view of an outboard motor configured in accordance with a preferred embodiment of the present invention. Certain components such as an engine, driveshaft, transmission, and impeller shaft are shown in phantom. A portion of an associated watercraft is shown in section.

With reference to FIGS. 1–5, an overall construction of an outboard motor 30 that employs an internal combustion engine 32 configured in accordance with certain features, aspects and advantages of the present invention is described below. The engine 32 has particular utility in the context of a marine drive, such as the outboard motor, and thus is described in the context of an outboard motor. The engine 32, however, can be used with other types of marine drives (i.e., inboard motors, inboard/outboard motors, etc.) and also certain land vehicles. Furthermore, the engine 32 can be used as a stationary engine for some applications that will become apparent to those of ordinary skill in the art.

In the illustrated arrangement, the outboard motor 30 generally comprises a drive unit 34 and a bracket assembly 36. The bracket assembly 36 supports the drive unit 34 on a transom 38 of an associated watercraft 40 and places a marine propulsion device 41 in a submerged position with the watercraft 40 resting relative to a surface of a body of water WL. The bracket assembly 36 preferably comprises a swivel bracket 42, a clamping bracket 44, a steering shaft and a pivot pin 46.

The steering shaft typically extends through the swivel bracket 42 and is affixed to the drive unit 34 by top and bottom mount assemblies 43. The steering shaft is pivotally journaled for steering movement about a generally vertically extending steering axis defined within the swivel bracket 42. The clamping bracket 44 comprises a pair of bracket arms that are spaced apart from each other and that are affixed to the watercraft transom 38. The pivot pin 46 completes a hinge coupling between the swivel bracket 42 and the clamping bracket 44. The pivot pin 46 extends through the bracket arms so that the clamping bracket 44 supports the swivel bracket 42 for pivotal movement about a generally horizontally extending tilt axis defined by the pivot pin 46. The drive unit 34 thus can be tilted or trimmed about the pivot pin 46.

As used through this description, the terms "forward," "forwardly" and "front" mean at or to the side where the bracket assembly 36 is located, and the terms "rear," "reverse," "backwardly" and "rearwardly" mean at or to the opposite side of the front side, unless indicated otherwise or otherwise readily apparent from the context use.

A hydraulic tilt and trim adjustment system 48 preferably is provided between the swivel bracket 42 and the clamping bracket 44 for tilt movement (raising or lowering) of the swivel bracket 42 and the drive unit 34 relative to the clamping bracket 44. Otherwise, the outboard motor 30 can have a manually operated system for tilting the drive unit 34. Typically, the term "tilt movement", when used in a broad sense, comprises both a tilt movement and a trim adjustment movement.

The illustrated drive unit 34 comprises a power head 50 and a housing unit 52 which includes a driveshaft housing 54 and a lower unit 56. The power head 50 is disposed atop the drive unit 34 and includes an internal combustion engine 32 and a protective cowling assembly 60. Preferably, the protective cowling 60, which preferably is made of plastic, defines a generally closed cavity 62 (FIGS. 2–4) in which the engine 32 is disposed. The protective cowling assembly 60 preferably comprises a top cowling member 64 and a bottom cowling member 66. The top cowling member 64 preferably is detachably affixed to the bottom cowling member 66 by a coupling mechanism so that a user, operator, mechanic or repairperson can access the engine 32 for maintenance or for other purposes.

Figure 2:
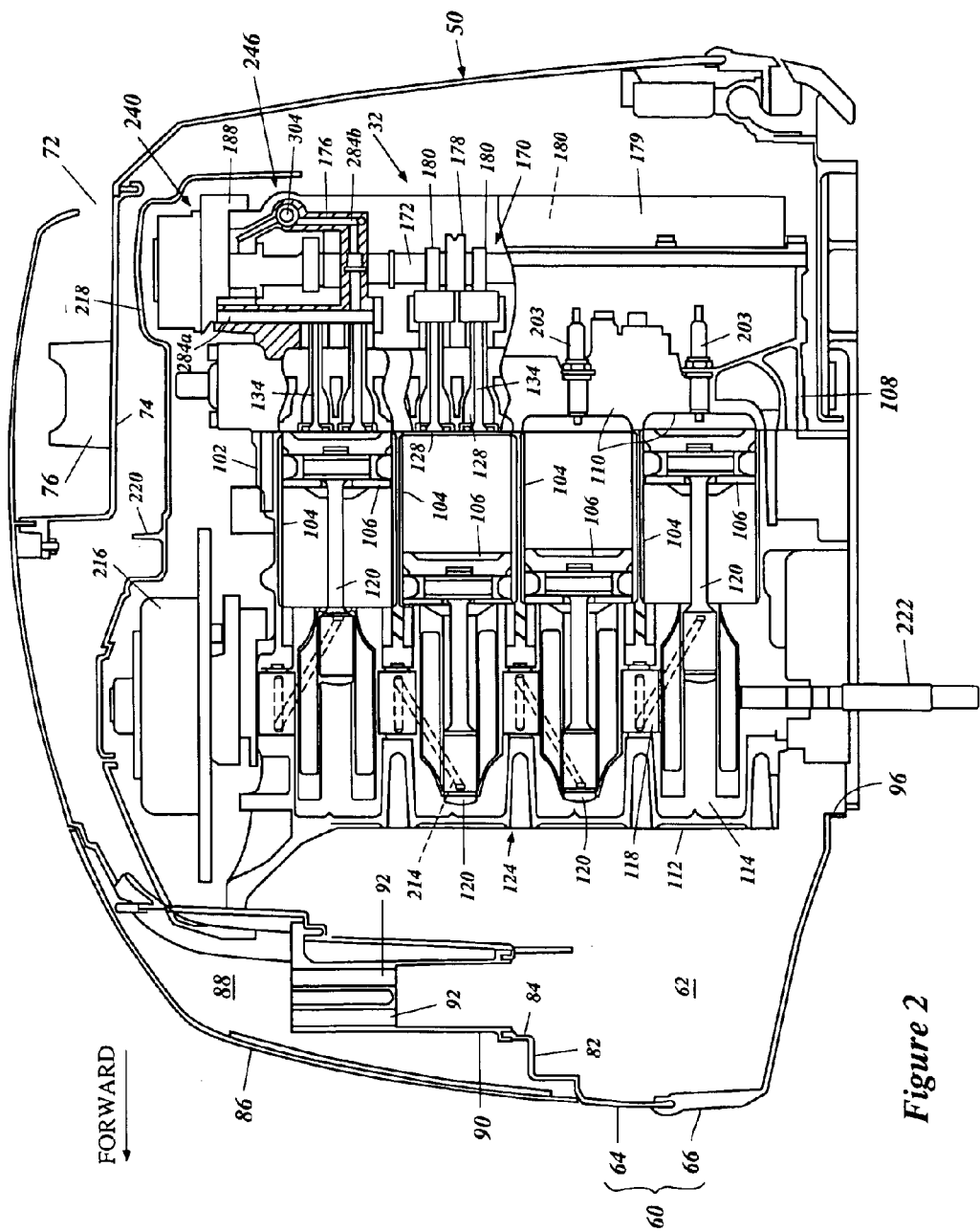
FIG. 2 is a partial sectional and side elevational view of a power head of the outboard motor of FIG. 1. A camshaft drive mechanism generally is omitted in this figure except for an intake driven sprocket.
Figure 4:
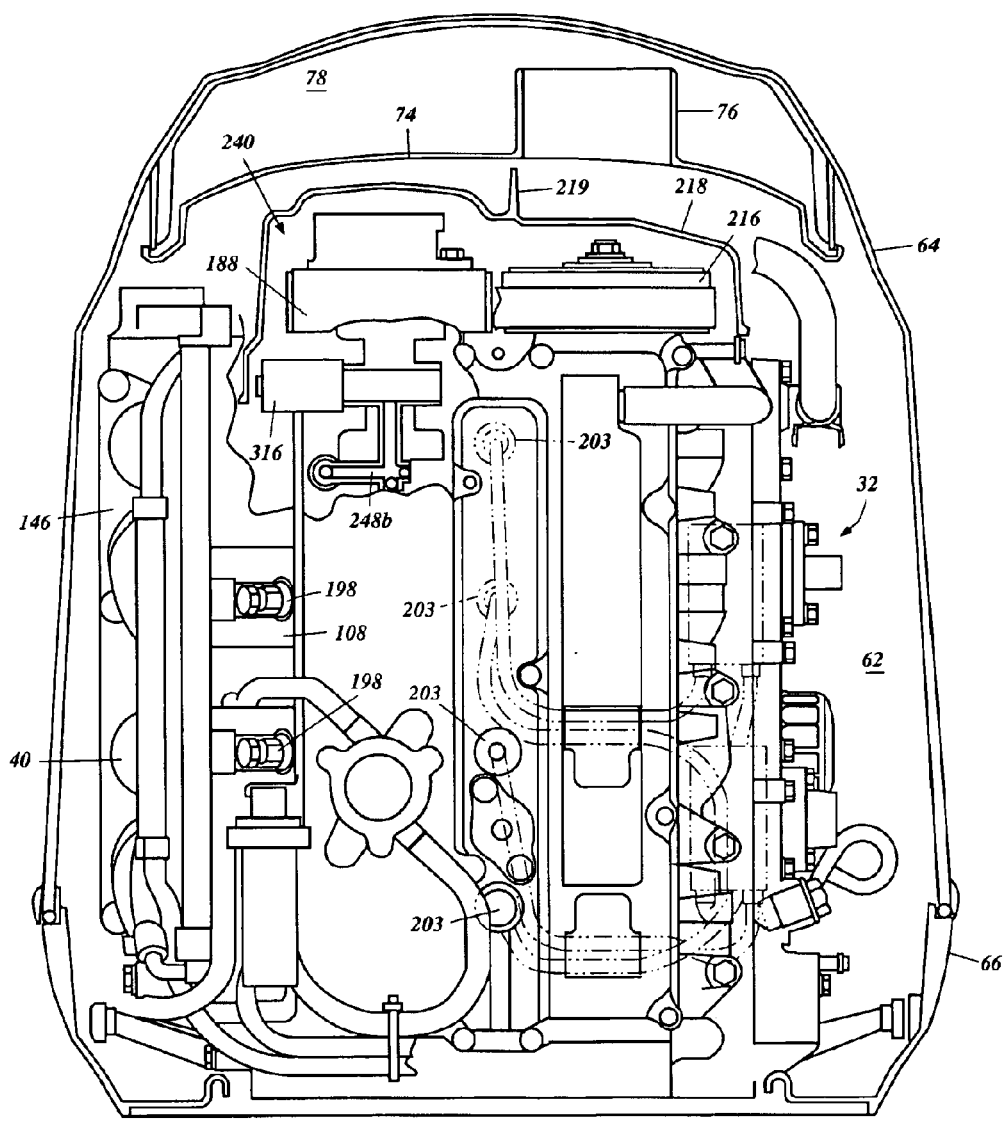
FIG. 4 is a partial cut-away and rear elevational view of the power head. The cowling assembly is shown in section.

With reference to FIG. 2, the top cowling member 64 preferably has a rear intake opening 72 on its rear and top portion. A rear intake member 74 with a rear air duct 76 is affixed to the top cowling member 64. The rear intake member 74, together with the rear top portion of the top cowling member 64, forms a rear air intake space 78. With particular reference to FIG. 4, the rear air duct 76 preferably is disposed to the starboard side of a central portion of the rear intake member 74.

With reference back to FIG. 2, the top cowling member 64 also defines a recessed portion 82 at a front end thereof. An opening 84 is defined along a portion of the recessed portion 82 on the starboard side. The opening 84 extends into the interior of the top cowling member 64. An outer shell 86 is disposed over the recessed portion 82 to define a front air intake space 88. A front air duct 90 is affixed to the recessed portion 82 of the top cowling member 64 and extends upward from the opening 84. In this manner, the air flow path into the closed cavity 62 can include an elevated entrance from the front air intake space 88. The air duct 90 preferably has a plurality of apertures 92, each of which preferably is cylindrical.

A front intake opening (not shown) preferably is defined between the recessed portion 82 of the top cowling member 82 and the outer shell 86 so that the front intake space 88 communicates with outside of the cowling assembly 60. Ambient air thus is drawn into the closed cavity 62 through the rear intake opening 72 or the front intake opening (not shown) and further through the air ducts 76, 90. Typically, the top cowling member 64 tapers in girth toward its top surface, which is in the general proximity of the air intake opening 72.

The bottom cowling member 66 preferably has an opening 96 (FIG. 2) through which an upper portion of an exhaust guide member 98 (FIG. 1) extends. The exhaust guide member 98 preferably is made of aluminum alloy and is affixed atop the driveshaft housing 54. The bottom cowling member 66 and the exhaust guide member 98 together generally form a tray. The engine 32 is placed onto this tray and is affixed to the exhaust guide member 98. The exhaust guide member 98 also has an exhaust passage through which burnt charges (e.g., exhaust gases) from the engine 32 are discharged.

Figure 3:
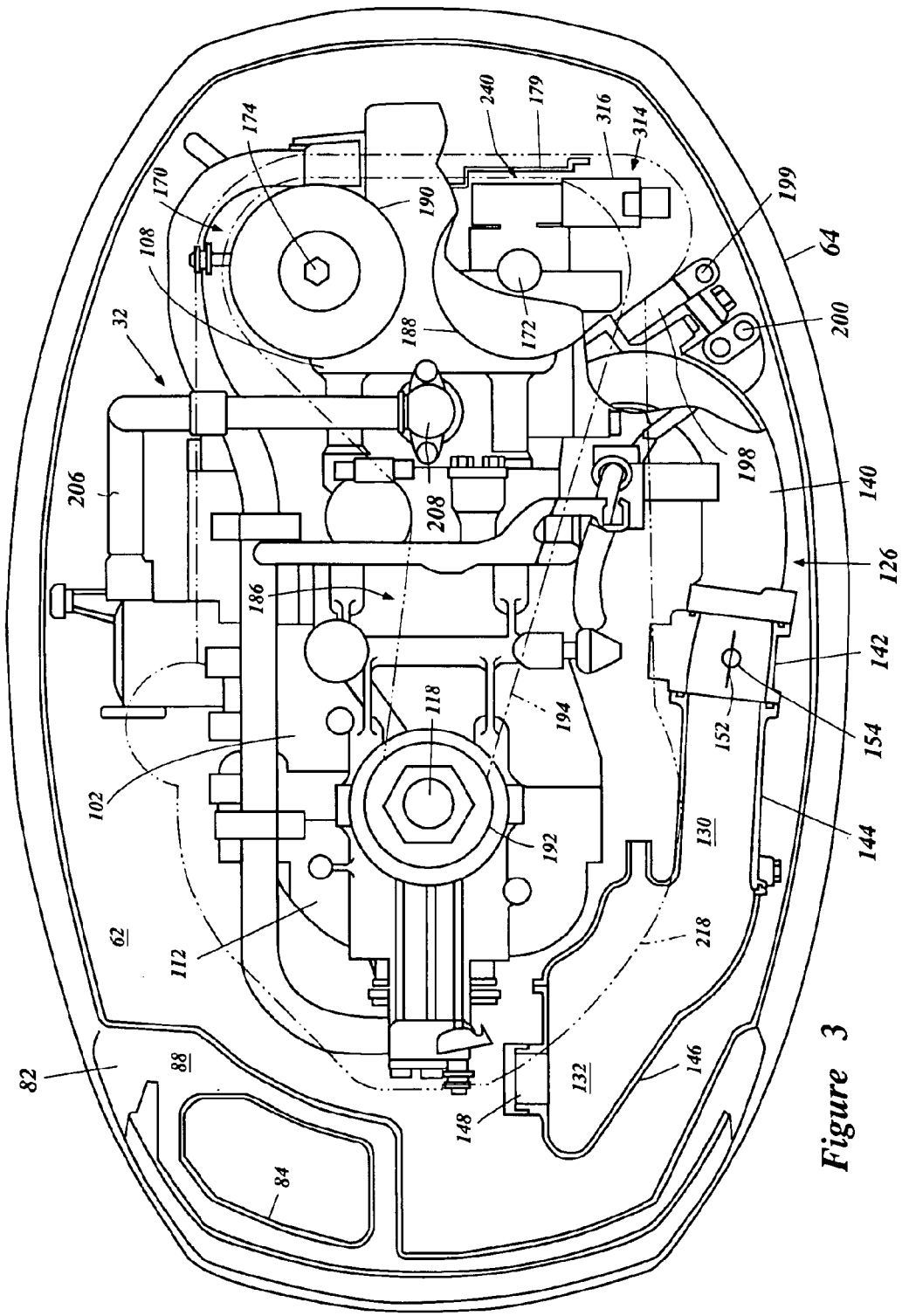
FIG. 3 is a partial top plan and sectional view of the power head shown in FIG. 2. A cowling assembly is shown in section. The engine is partially illustrated in section.

With particular reference to FIGS. 2–4, the engine 32 in the illustrated embodiment preferably operates on a four-cycle combustion principle. The engine 32 has a cylinder block 102. The presently preferred cylinder block 102 defines four in-line cylinder bores 104 which extend generally horizontally and which are generally vertically spaced from one another. As used in this description, the term "horizontally" means that the subject portions, members or components extend generally in parallel to the water line WL when the associated watercraft 40 is substantially stationary with respect to the water line WL and when the drive unit 34 is not tilted and is placed in the position shown in FIG. 1. The term "vertically" in turn means that portions, members or components extend generally normal to those that extend horizontally. This type of engine, however, merely exemplifies one type of engine on which various aspects and features of the present invention can be suitably used. Engines having other numbers of cylinders, having other cylinder arrangements (V, W, opposing, etc.), and operating on other combustion principles (e.g., crankcase compression two-stroke, diesel, or rotary) also can employ various features, aspects and advantages of the present invention. In addition, the engine can be formed with separate cylinder bodies rather than a number of cylinder bores formed in a cylinder block. Regardless of the particular construction, the engine preferably comprises an engine body that includes at least one cylinder bore.

A moveable member, such as a reciprocating piston 106, moves relative to the cylinder block 102 in a suitable manner. In the illustrated arrangement, a piston 106 reciprocates within each cylinder bore 104.

A cylinder head member 108 is affixed to one end of the cylinder block 102 to close that end of the cylinder bores 104. The cylinder head member 108, together with the associated pistons 106 and cylinder bores 104, preferably defines four combustion chambers 110. Of course, the number of combustion chambers can vary, as indicated above.

A crankcase member 112 closes the other end of the cylinder bores 104 and, together with the cylinder block 102, defines a crankcase chamber 114. A crankshaft or output shaft 118 extends generally vertically through the crankcase chamber 114 and can be journaled for rotation by several bearing blocks (not shown). Connecting rods 120 couple the crankshaft 118 with the respective pistons 106 in any suitable manner. Thus, the crankshaft 118 can rotate with the reciprocal movement of the pistons 106.

Preferably, the crankcase member 112 is located at the most forward position of the engine 32, with the cylinder block 102 and the cylinder head member 108 being disposed rearward from the crankcase member 112, one after another. Generally, the cylinder block 102 (or individual cylinder bodies), the cylinder head member 108 and the crankcase member 112 together define an engine body 124. Preferably, at least these major engine portions 102, 108, 112 are made of an aluminum alloy. The aluminum alloy advantageously increases strength over cast iron while decreasing the weight of the engine body 96.

The engine 32 also comprises an air induction system or device 126. The air induction system 126 draws air from within the cavity 62 to the combustion chambers 110. The air induction system 126 preferably comprises eight intake ports 128, four intake passages 130 and a single plenum chamber 132. In the illustrated arrangement, two intake ports 128 are allotted to each combustion chamber 110 and the two intake ports 128 communicate with a single intake passage 130.

The intake ports 128 are defined in the cylinder head member 108. Intake valves 134 are slidably disposed at the cylinder head member 108 to move between an open position and a closed position of the intake ports 128. As such, the valves 134 act to open and close the ports 128 to control the flow of air into the combustion chamber 110.

Biasing members, such as springs 136 (FIG. 5), are used to urge the intake valves 134 toward the respective closing positions by acting against a mounting boss formed on the illustrated cylinder head member 108 and a corresponding retainer 138 that is affixed to each of the valves 134. When each intake valve 134 is in the open position, the intake passage 130 that is associated with the intake port 128 communicates with the associated combustion chamber 110.

With reference to FIG. 3, each intake passage 130 preferably is defined with an intake manifold 140, a throttle body 142 and an intake runner 144. The intake manifold 140 and the throttle body 142 preferably are made of aluminum alloy, while the intake runner 144 is made of plastic. A portion of the illustrated intake runner 144 extends forwardly alongside of and to the front of the crankcase member 112.

With continued reference to FIG. 3, the respective portions of the intake runners 144, together with a plenum chamber member 146, define the plenum chamber 132. Preferably, the plenum chamber member 146 also is made of plastic. The plenum chamber 132 comprises an air inlet 148. The air in the closed cavity 62 is drawn into the plenum chamber 132 through the air inlet 148. The air is then passed through intake passages 130, the throttle body 142 and the intake manifold 140. In some arrangements, the plenum chamber 132 acts as an intake silencer to attenuate noise generated by the flow of air into the respective combustion chambers 110.

Each illustrated throttle body 142 has a butterfly type throttle valve 152 journaled for pivotal movement about an axis defined by a generally vertically extending valve shaft 154. Each valve shaft 154 can be coupled with the other valve shafts to allow simultaneous movement therewith. Thus, the valve shaft 154 is operable by the operator through an appropriate conventional throttle valve linkage and a throttle lever connected to the end of the linkage. The throttle valves 152 are movable between an open position and a closed position to meter or regulate an amount of air flowing through the respective air intake passages 130. Normally, the greater the opening degree, the higher the rate of airflow and the higher the power output from the engine.

In order to bring the engine 32 to idle speed and to maintain this speed, the throttle valves 152 generally are substantially closed. Preferably, the valves are not fully closed so as to produce a more stable idle speed and to prevent sticking of the throttle valves 152 in the closed position. As used through the description, the term "idle speed" generally means a low engine speed that achieved when the throttle valves 152 are closed but also includes a state such that the valves 152 are slightly more open to allow a minute amount of air to flow through the intake passages 130.

The air induction system 126 preferably includes an auxiliary air device (AAD) (not shown) that bypasses the throttle valves 152 and extends from the plenum chamber 132 to the respective intake passages 130 downstream of the throttle valves 152. Idle air can be delivered to the combustion chambers 110 through the AAD when the throttle valves 152 are placed in a substantially closed or closed position.

The AAD preferably comprises an idle air passage, an idle valve and an idle valve actuator. The idle air passage is branched off to the respective intake passages 130. The idle valve controls flow through the idle air passage such that the amount of air flow can be fine-tuned. Preferably, the idle valve is a needle valve that can move between an open position and a closed position, which closes the idle air passage. The idle valve actuator actuates the idle valve to a certain position to measure or adjust an amount of the idle air.

Figure 8:
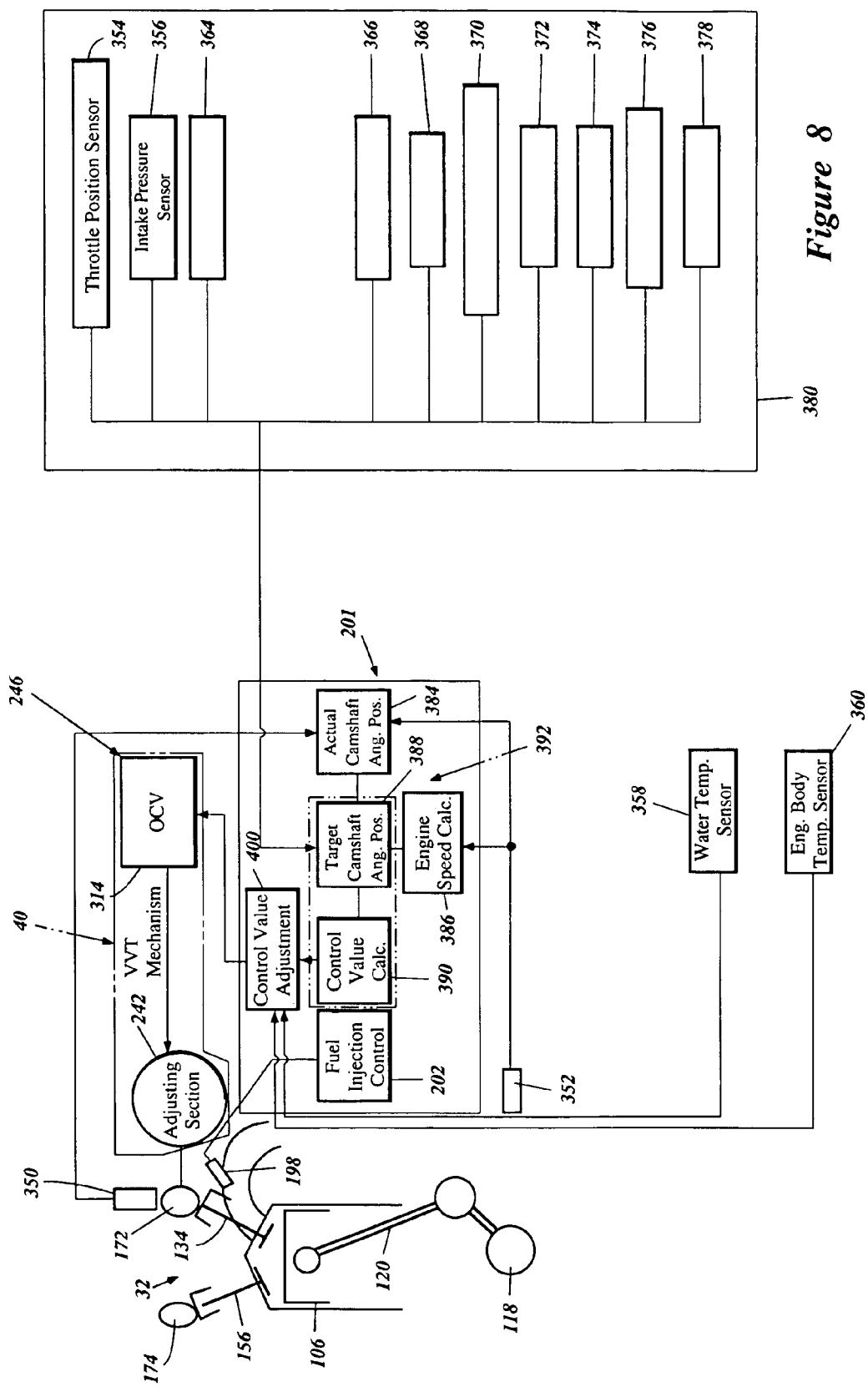
FIG. 8 is a schematic view of a control system of the VVT mechanism.

The engine 32 also comprises an exhaust system that guides burnt charges, i.e., exhaust gases, to a location outside of the outboard motor 30. Each cylinder bore 104 preferably has two exhaust ports (not shown) defined in the cylinder head member 108. The exhaust ports can be selectively opened and closed by exhaust valves. The exhaust valves are schematically illustrated in FIG. 8, described below in greater detail, and are identified by the reference numeral 156. The construction of each exhaust valve and the arrangement of the exhaust valves are substantially the same as the intake valves 134 and the arrangement thereof, respectively.

An exhaust manifold (not shown) preferably is disposed next to the exhaust ports (not shown) and extends generally vertically. The exhaust manifold (not shown) communicates with the combustion chambers 110 through the exhaust ports (not shown) to collect exhaust gases therefrom. The exhaust manifold (not shown) is coupled with the foregoing exhaust passage (not shown) of the exhaust guide member 98. When the exhaust ports (not shown) are opened, the combustion chambers 110 communicate with the exhaust passage (not shown) through the exhaust manifold.

Figure 5:
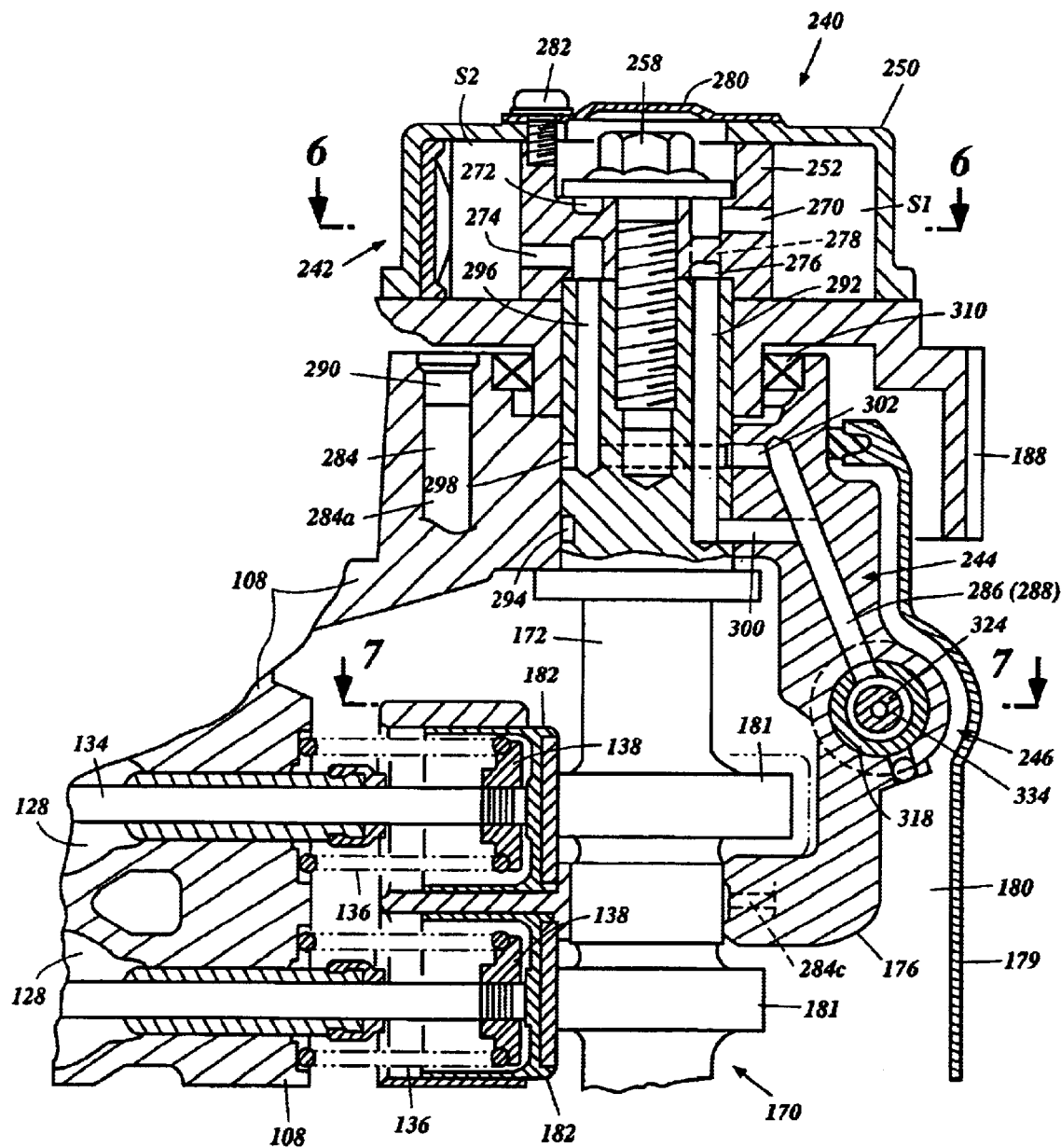
FIG. 5 is an enlarged, sectional side view of the engine illustrating a VVT mechanism thereof.

With particular reference to FIGS. 2, 3 and 5, a valve cam mechanism or valve actuator 170 preferably is provided for actuating the intake valves 134 and the exhaust valves 156 (FIG. 8). In the illustrated arrangement, the valve cam mechanism 170 includes an intake camshaft 172 and an exhaust camshaft 174 both extending generally vertically and journaled for rotation relative to the cylinder head member 108. In the illustrated arrangement, bearing caps 176, 178 (FIG. 2) journal the camshafts 172, 174 with the cylinder head member 108. A camshaft cover 179 is affixed to the cylinder head member 108 to define a camshaft chamber 180 together with the cylinder head member 108.

Each camshaft 172, 174, as shown in FIG. 5, has cam lobes 181 configured to push valve lifters 182 that are affixed to the respective ends of the intake valves 134 and exhaust valves 156 (FIG. 8) as in any suitable manner. The cam lobes 181 repeatedly push the valve lifters 182 in a timed manner, which is in proportion to the engine speed, i.e., the speed of rotation of the crankshaft 118. The movement of the lifters 182 generally is timed by the rotation of the camshafts 172, 174 to appropriately actuate the intake valves 134 and the exhaust valves.

With particular reference to FIG. 3, a camshaft drive mechanism 186 drives the valve cam mechanism 170. The intake camshaft 172 and the exhaust camshaft 174 comprise an intake driven sprocket 188 positioned atop the intake camshaft 172 and an exhaust driven sprocket 190 positioned atop the exhaust camshaft 174, respectively. The crankshaft 118 has a drive sprocket 192 positioned at an upper portion thereof. Of course, other locations of the sprockets also can be used. The illustrated arrangement, however, advantageously results in a compactly arranged engine.

A timing chain or belt 194 is wound around the driven sprockets 188, 190 and the drive sprocket 192. The crankshaft 118 thus drives the respective camshafts 172, 174 through the timing chain 194 in the timed relationship. Because the camshafts 172, 174 must rotate at half of the speed of the rotation of the crankshaft 118 in the four-cycle combustion principle, a diameter of the driven sprockets 188, 190 is twice as large as a diameter of the drive sprocket 192.

With reference to FIGS. 3 and 4, the engine 32 preferably has a port or manifold fuel injection system. The fuel injection system preferably comprises four fuel injectors 198 with one fuel injector allotted for each of the respective combustion chambers 110 through suitable fuel conduits, such as fuel rails 199. The fuel injectors 198 are mounted on the fuel rail 199, which is mounted on the cylinder head member 108. Each fuel injector 198 preferably has an injection nozzle directed toward the associated intake passage 130 adjacent to the intake ports 134. Preferably, at least one fuel cooler 200 is disposed in thermal communication with the fuel rail 199, to thereby cool fuel flowing through the fuel rail 199. The fuel cooler 200 can be supplied with coolant from the cooling system, described in greater detail below.

The fuel injectors 198 spray fuel into the intake passages 130 under control of an ECU which preferably is mounted on the engine body 124 at an appropriate location. The ECU is shown in FIG. 8 with reference numeral 201 and controls both the start timing and the duration of the fuel injection cycle of the fuel injectors 198 so that the nozzles spray a proper amount of the fuel per combustion cycle. This control also is illustrated in FIG. 8 with reference numeral 202 and is described below in greater detail. Of course, the fuel injectors 198 can be disposed for direct cylinder injection and carburetors can replace or accompany the fuel injectors 198.

With reference to FIGS. 2 and 4, the engine 32 further comprises an ignition or firing system. Each combustion chamber 110 is provided with a spark plug 203 that is connected to the ECU 201 (FIG. 8) through an igniter so that ignition timing is also controlled by the ECU 201. Each spark plug 203 has electrodes that are exposed into the associated combustion chamber and are spaced apart from each other with a small gap. The spark plugs 203 generate a spark between the electrodes to ignite an air/fuel charge in the combustion chamber 110 at selected ignition timing under control of the ECU 201.

In the illustrated engine 32, the pistons 106 reciprocate between top dead center and bottom dead center. When the crankshaft 118 makes two rotations, the pistons 106 generally move from the top dead center to the bottom dead center (the intake stroke), from the bottom dead center to the top dead center (the compression stroke), from the top dead center to the bottom dead center (the power stroke) and from the bottom dead center to the top dead center (the exhaust stroke). During the four strokes of the pistons 106, the camshafts 172, 174 make one rotation and actuate the intake valves 134 and the exhaust valves 156 (FIG. 8) to open the intake ports 128 during the intake stroke and to open exhaust ports during the exhaust stroke, respectively.

Generally, during the intake stroke, air is drawn into the combustion chambers 110 through the air intake passages 130 and fuel is injected into the intake passages 130 by the fuel injectors 198. The air and the fuel thus are mixed to form the air/fuel charge in the combustion chambers 110. Slightly before or during the power stroke, the respective spark plugs 203 ignite the compressed air/fuel charge in the respective combustion chambers 110. The air/fuel charge thus rapidly burns during the power stroke to move the pistons 106. The burnt charge, i.e., exhaust gases, then are discharged from the combustion chambers 110 during the exhaust stroke.

During engine operation, heat builds in the engine body 124. The illustrated engine 32 thus includes a cooling system to cool the engine body 124. The outboard motor 30 preferably employs an open-loop type water cooling system that introduces cooling water from the body of water surrounding the motor 30 and then discharges the water to the water body. The cooling system includes one or more water jackets defined within the engine body 124 through which the introduced water travels around to remove the heat of the engine body 124. The cooling system has a water discharge pipe 206 (FIG. 3) that extends along an outer surface of the engine body 124 for conveying the discharge water.

A thermostat chamber 208 preferably is defined at a location where the discharge pipe 206 is connected to the engine body 124 to enclose a thermostat that controls flow of the discharge water. A water temperature is relatively low until the engine is warmed up and the thermostat closes at this temperature to inhibit the water from flowing out so that the engine 32 can be warmed up quickly. The thermostat preferably is set to open at a temperature of about 50–60° C.

The engine 32 also preferably includes a lubrication system. A closed-loop type system preferably is employed in the illustrated embodiment. The lubrication system comprises a lubricant tank defining a reservoir cavity, which preferably is positioned within the driveshaft housing 54. An oil pump (not shown) is provided at a desired location, such as atop the driveshaft housing 54, to pressurize the lubricant oil in the reservoir cavity and to pass the lubricant oil through a suction pipe toward certain engine portions, which desirably are lubricated, through lubricant delivery passages. The engine portions that need lubrication include, for example, the crankshaft bearings (not shown), the connecting rods 120 and the pistons 106. For example, portions 214 of the delivery passages (FIG. 2) are defined in the crankshaft 118. Lubricant return passages (not shown) also are provided to return the oil to the lubricant tank for re-circulation.

A flywheel assembly 216 (FIG. 2) preferably is positioned at the upper portion of the crankshaft 118 and is mounted for rotation with the crankshaft 118. The flywheel assembly 216 comprises a flywheel magneto or AC generator that supplies electric power to various electrical components such as the fuel injection system, the ignition system and the ECU 201 (FIG. 8). A protective cover 218, which preferably is made of plastic, extends over majority of the top surface of the engine 32 and preferably covers the portion that includes the fly wheel assembly 216 and the camshaft drive mechanism 186.

The protective cover 218 preferably has a rib 219 (FIG. 4) that reduces or eliminates the amount of air flowing directly toward the engine portion that has the air induction system 126, i.e., to the portion on the starboard side. The protective cover 218 also preferably has a rib 220 (FIG. 2) that substantially or completely inhibits air from flowing directly toward a front portion of the engine body 124. The ribs 219, 222 advantageously help direct the airflow around the engine body 124 to cool the engine body 124. As seen in FIG. 2, a bottom portion, at least in part, of the protective cover 218 desirably is left open to allow heat to radiate from the engine 32.

With reference back to FIG. 1, the driveshaft housing 54 depends from the power head 50 to support a driveshaft 222 which is coupled with the crankshaft 118 and which extends generally vertically through the driveshaft housing 54. The driveshaft 222 is journaled for rotation and is driven by the crankshaft 118. The driveshaft housing 54 preferably defines an internal section of the exhaust system that leads the majority of exhaust gases to the lower unit 56. An idle discharge section is branched off from the internal section to discharge idle exhaust gases directly out to the atmosphere through a discharge port that is formed on a rear surface of the driveshaft housing 54 in idle speed of the engine 32. The driveshaft 222 preferably drives the oil pump.

With continued reference to FIG. 1, the lower unit 56 depends from the driveshaft housing 54 and supports a propulsion shaft 226 that is driven by the driveshaft 222. The propulsion shaft 226 extends generally horizontally through the lower unit 56 and is journaled for rotation. The propulsion device 41 is attached to the propulsion shaft 226. In the illustrated arrangement, the propulsion device includes a propeller 228 that is affixed to an outer end of the propulsion shaft 226. The propulsion device, however, can take the form of a dual counter-rotating system, a hydrodynamic jet, or any of a number of other suitable propulsion devices.

A transmission 232 preferably is provided between the driveshaft 222 and the propulsion shaft 226, which lie generally normal to each other (i.e., at a 90° shaft angle) to couple together the two shafts 222, 226 by bevel gears. The outboard motor 30 has a clutch mechanism that allows the transmission 232 to change the rotational direction of the propeller 228 among forward, neutral or reverse.

The lower unit 56 also defines an internal section of the exhaust system that is connected with the internal section of the driveshaft housing 54. At engine speeds above idle, the exhaust gases generally are discharged to the body of water surrounding the outboard motor 30 through the internal sections and then a discharge section defined within the hub of the propeller 228.

VVT Mechanism

With continued reference to FIGS. 2–5 and with additional reference to FIGS. 6 and 7, a VVT mechanism 240 is described below.

The VVT mechanism 240 preferably is configured to adjust the intake camshaft 172 to varied angular positions between two limit angular positions, i.e., a fully advanced angular position and a fully retarded angular position, relative to an angular position of the crankshaft. At the fully advanced angular position, the intake camshaft 172 opens and closes the intake valves 134 at an advanced timing. At the fully retarded angular position, the intake camshaft 172 opens and closes the intake valves 134 at a retarded timing.

The VVT mechanism 240 preferably is hydraulically operated and thus comprises an adjusting section 242, a fluid supply and discharge section 244 and a control section 246. The adjusting section 242 sets the intake camshaft 172 to the certain angular position in response to a volume of working fluid that is allotted to two spaces of the adjusting section 242. The fluid supply and discharge section 244 preferably supplies a portion of the lubricant, which is used primarily for the lubrication system, to the adjusting section 242 as the working fluid. The control section 246 selects the rate or amount of the fluid directed to the adjusting section 242 under control of the ECU 201 (FIG. 8).

The adjusting section 242 preferably includes an outer housing 250 and an inner rotor 252. The outer housing 250 is affixed to the intake driven sprocket 188 by three bolts 254 in the illustrated arrangement and preferably forms three chambers 256 between the three bolts 254. Any other suitable fastening technique and any suitable number of chambers 256 can be used. The inner rotor 252 is affixed atop the intake camshaft 172 by a bolt 258 and has three vanes 260 pivotally placed within the respective chambers 256 of the housing 250. The number of vanes 260 can be varied and the inner rotor 252 can be attached to the camshaft 172 in any suitable manners.

Figure 6:
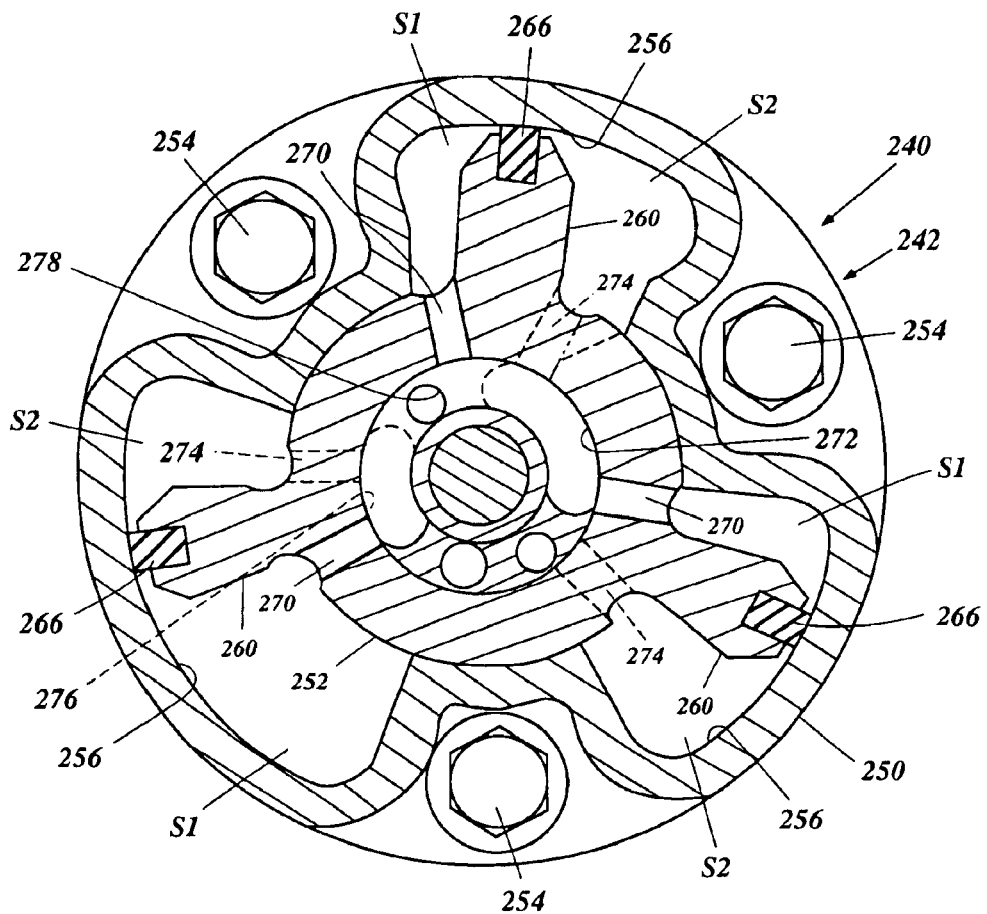
FIG. 6 is a sectional view of the VVT mechanism taken along the line 6—6 of FIG. 5.

With particular reference to FIG. 6, the vanes 260 preferably extend radially and are spaced apart from each other with an angle of about 120 degrees. The two sides of the vane 260, together with the walls of each chamber 256 define a first space S1 and a second space S2 respectively. Seal members 266 carried by the respective vanes 260 and abutting on an inner surface of the housing 250 separate the first and second spaces S1, S2 from each other.

The respective first spaces S1 communicate with one another through respective pathways 270 and a passage 272 that is formed around the bolt 258. The respective second spaces S2 communicate with one another through respective pathways 274 and a passage 276 that is also formed around the bolt 258. The passages 272, 276 generally are configured as an incomplete circular shape and can be offset from one another (e.g., 60 degrees offset may be used). A pathway 278 extends from the passage 272 to a bottom portion of the rotor 252 through ends of the passage 276. A cover member 280 is affixed to the outer housing 250 by screws 282 to cover the bolt 258. The passages 272, 276 allow fluid communication with the respective pathways 270, 274, 278 during rotation of the camshaft 172.

With particular reference to FIGS. 2 and 5, the fluid supply and discharge section 244 preferably includes a supply passage 284 and two delivery passages 286, 288. The supply passage 284 and the delivery passages 286, 288 communicate with one another through the control section 246. The supply passage 284 preferably has a passage portion 284a (FIGS. 2 and 5) defined in the cylinder head member 108 and a passage portion 284b (FIG. 2) defined in the bearing cap 176. The passage portion 284a is connected to the lubrication system, while the passage portion 284b is connected to the control section 246. Thus, the lubricant oil of the lubrication system is supplied to the control section 246 through the fluid supply and discharge passage 284.

The supply passage 284 communicates with the lubrication system so that a portion of the lubricant oil is supplied to this VVT mechanism 240 through the passage portions 284a, 284b. Because the passage portion 284a is formed by a drilling process in the illustrated embodiment, a closure member 290 closes one end of the passage portion 284a. The passage portion 284b is branched off to a camshaft lubrication passage 284c (FIG. 5) which delivers lubricant for lubrication of a journal of the camshaft 172.

The delivery passages 286, 288 preferably are defined in a top portion of the camshaft 172 and the bearing cap 176.

A portion of the delivery passage 286 formed in the camshaft 172 includes a pathway 292 that extends generally vertically and that communicates with the pathway 278 that communicates with the passage 272 of the first space S1. The pathway 292 also communicates with a passage 294 that is formed in the camshaft 172. A portion of the delivery passage 288 formed in the camshaft 172, in turn, includes a pathway 296 that extends generally vertically and communicates with the passage 276 of the second space S2. The pathway 296 also communicates with a passage 298 that is formed in the camshaft 172. A portion of the delivery passage 286 formed in the bearing cap 176 includes a pathway 300 that extends generally vertically and generally horizontally to communicate with the passage 294, while a portion of the delivery passage 288 formed in the bearing cap 176 includes a pathway 302 that extends generally vertically and generally horizontally to communicate with the passage 298. The other ends of the pathways 300, 302 communicate with a common chamber 304 formed in the control section 246 through ports 306, 308, respectively.

A seal member 310 (FIG. 5) is inserted between the cylinder head member 108, the camshaft 172 and the bearing cap 176 to inhibit the lubricant from leaking out. It should be noted that FIGS. 5 and 7 illustrate the delivery passages 286, 288 in a schematic fashion. The passages 286, 288 do not merge together.

Figure 7:
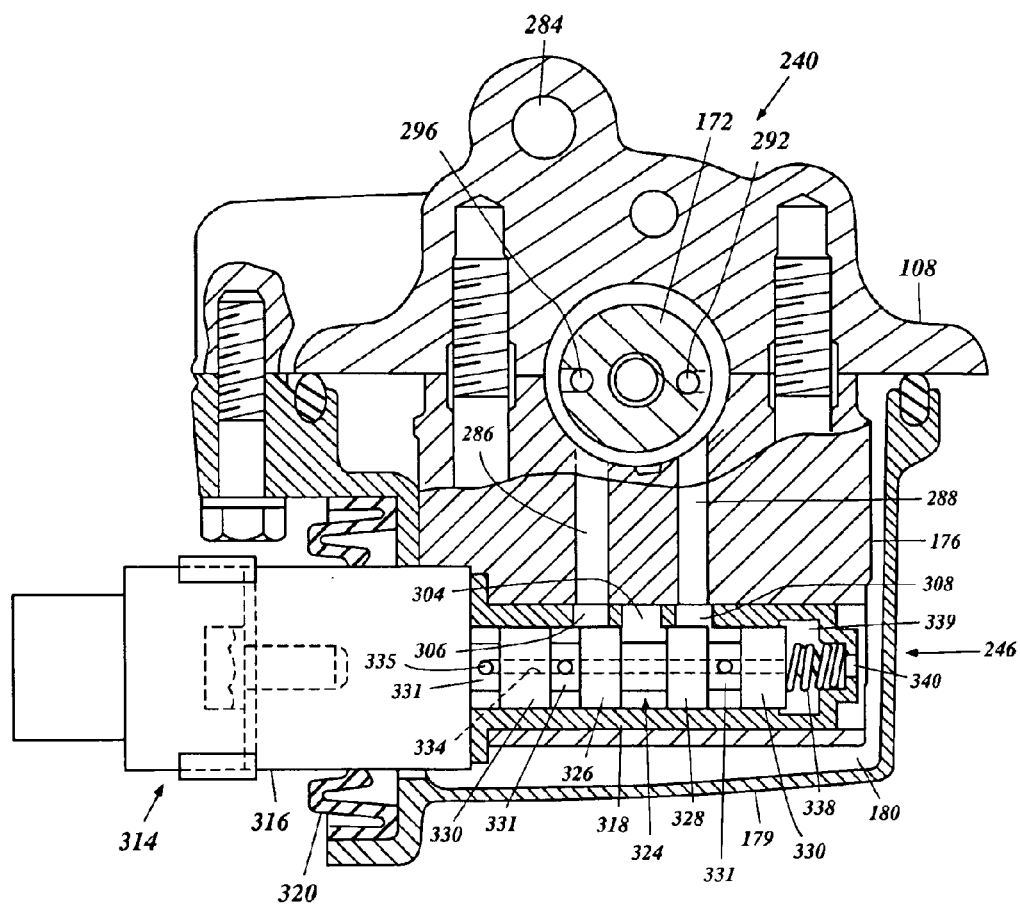
FIG. 7 is a sectional view of the VVT mechanism taken partially along the line 7—7 of FIG. 5.

The control section 246 preferably includes an oil control valve (OCV) 314 (FIG. 7). The OCV 314 comprises a housing section 316 and a cylinder section 318. Both the housing and cylinder sections 316, 318 preferably are received in the bearing cap 176. Because the sections 316, 318 together extend through a hole of the camshaft cover 179, a bellow 320 made of rubber is provided between the housing section 316 and the camshaft cover 179 to close and seal the through-hole.

The cylinder section 318 defines the common chamber 304 that communicates with the supply passage 284 and the delivery passages 286, 288. The housing section 316 preferably encloses a solenoid type actuator (not shown), although other actuators of course are available. The solenoid actuator is connected to the battery 500 so that the electric power is supplied to the solenoid actuator. A rod 324 extends into the common chamber 304 from the actuator and is axially movable therein. The rod 324 has a pair of valves 326, 328 and a pair of guide portions 330. The valves 326, 328 and the guide portions 330 have an outer diameter that is larger than an outer diameter of the remainder portions 331 of the rod 324 and is generally equal to an inner diameter of the cylinder section 318. The rod 324 defines an internal passage 334 extending through the rod 324 and apertures 335 communicating with the passage 334 and the common chamber 304 to allow free flow of the lubricant in the chamber 304. A coil spring 338 is retained in a spring retaining space 339 at an end of the cylinder 318 opposite to the housing section 316 to urge the rod 324 toward the actuator. The lubricant can be drained to the camshaft chamber 180 through the spring retaining chamber 339 and a drain hole 340.

The solenoid actuator actuates the rod 324 under control of the ECU 201 (FIG. 8) so that the rod 324 can take any positions in the chamber 304. More specifically, the solenoid pushes the rod 324 toward the certain position in compliance with commands of the ECU 201. If a certain position designated by the ECU 201 is closer to the solenoid actuator than the present position, then the solenoid actuator does not actuate the rod 324 and the coil spring 338 pushes back the rod 324 to the desired position. Otherwise, the solenoid actuator can be configured to pull the rod 324 back to the position.

The valve 326 can close the port 306 entirely or partially, while the valve 328 can close the port 308 entirely or partially. Each rate of the closing degree determines an amount of the lubricant that is allotted to each delivery passage 286, 288 and to each space S1, S2 in the adjusting section 242. Each allotted rate of the lubricant to each space S1, S2 then determines an angular position of the camshaft 172. If more lubricant is allotted to the first space S1 than to the second space S2, the camshaft 172 is set closer to the fully advanced position, and vise versa.

The oil pump pressurizes the lubricant oil to the supply passage 284 and further to the common chamber 304 of the cylinder 318. Meanwhile, the ECU 201 (FIG. 8) controls the solenoid to place the rod 324 at a position where the respective rates of the closing degrees of the valves 326, 328 are determined so that a corresponding angular position of the camshaft 172 is determined. Preferably, a drain is provided to allow the lubricant oil to drain from the space that is being evacuated while pressurized lubricant oil flows into the opposing space.

In one mode of operation, for example, the lubricant oil is fed to the common chamber 304 of the cylinder 318. Thus, the common chamber 304 has a positive pressure. To move the camshaft 172 in a first direction relative to the input sprocket 188, the common chamber 304 is linked with the delivery passage 286 while the other of the delivery passage 288 is linked to a drain. Thus, pressurized oil will flow into the first space S1 while oil will be displaced from the second space S2. The displaced oil flows to a drain and returns to the lubrication system. Once the desired movement has occurred, the rod 324 is returned to a neutral position in which the common chamber 304 is no longer communicating with either of the delivery passages 286, 288. Additionally, in the neutral position, neither of the delivery passages 286, 288 communicates with the drain in one particularly advantageous arrangement. Of course, by varying the placement and size of the seals, a constant flow can be produced from supply to drain while the rod 324 is in a neutral position. Also, a constant flow into the delivery lines also can be constructed. In the illustrated arrangement, however, no flow preferably occurs with the system in a neutral position.

The engine and the VVT mechanism are disclosed in, for example, a co-pending U.S. application filed Jun. 11, 2001, titled FOUR-CYCLE ENGINE FOR MARINE DRIVE, which serial number is Ser. No. 09/878,323, the entire contents of which is hereby expressly incorporated by reference.

Control System

With reference to FIG. 8, a valve timing control system of the VVT mechanism 40 using the ECU 201 will now be described below.

FIG. 8 schematically illustrates the engine 32. The illustrated ECU 201 controls the valve timing of the intake valves 134 by changing the angular positions of the intake camshaft 172 through the VVT mechanism 40. The ECU 201 also controls the fuel injectors 198 using the fuel injection control module 202. The ECU 201 is connected to the OCV 314 as the control section 246 of the VVT mechanism 40 and the fuel injectors through control signal lines.

In order to control the VVT mechanism 40 and the fuel injectors 198, the ECU 201 can employ various sensors which sense operational conditions of the engine 32 and/or the outboard motor 30. In the present system, the ECU 201 uses a camshaft angle position sensor 350, a crankshaft angle position sensor 352, a throttle position sensor (or throttle valve opening degree sensor) 354 and an intake pressure sensor 356. The ECU 201 is connected to the sensors 350, 352, 354, 356 through sensor signal lines.

The camshaft angle position sensor 350 is associated with the intake camshaft 172 to sense an angular position of the intake camshaft 172 and sends an actual camshaft angular position signal to the ECU 201 through the signal line. The crankshaft angle position sensor 352 is associated with the crankshaft 118 to sense an angular position of the crankshaft 118 and sends a crankshaft angular position signal to the ECU 201 through the signal line. Both the camshaft angle position sensor 350 and the crankshaft angle position sensor 352 in the present system generate pulses as the respective signals. The pulse of the camshaft position sensor 350 can give an actual angular position of the camshaft 172. The crankshaft position signal together with the camshaft position signal allows the ECU 201 to accurately determine the position of the camshaft 172 in relation to the crankshaft 118.

The throttle position sensor 354 preferably is disposed atop the valve shaft 154 to sense an angular position between the open and closed angular positions of the throttle valves 152 and sends a throttle valve opening degree signal to the ECU 201 through the signal line.

The intake sensor 356 preferably is disposed either within one of the intake passages 130 or within the plenum chamber 132 to sense an intake pressure therein. Because the respective intake passages 130 are formed such that each generally is the same size as the others, and because the plenum chamber 132 collects a large volume of air that is supplied to each of the intake passages 130, every passage 130 has substantially equal pressure and a signal of the intake pressure sensor 356 thus can represent a condition of the respective pressure. Thus, it should be appreciated that a single pressure sensor or multiple pressure sensors can be used.

The throttle valve position sensor 354 and the intake pressure sensor 356 preferably are selected from a type of sensor that indirectly senses an amount of air in the induction system. Another type of sensor that directly senses the air amount, of course, can be applicable. For example, moving vane types, heat wire types and Karman Vortex types of air flow meters also can be used.

The operator's demand or engine load, as determined by the throttle opening degree, is sensed by the throttle position sensor 354. Generally, in proportion to the change of the throttle opening degree, the intake air pressure also varies and is sensed by the intake pressure sensor 356. The throttle valve 152 (FIG. 3) is opened when the operator operates the throttle lever to increase the speed of the watercraft 40. The intake pressure almost simultaneously decreases at this moment.

The engine load can also increase when the associated watercraft 40 advances against wind. In this situation, the operator also operates the throttle lever to recover the speed that may be lost. Therefore, as used in this description, the term "acceleration" means not only the acceleration in the narrow sense but also the recovery operation of speed by the operator in a broad sense. Also, the term "sudden acceleration" means the sudden acceleration in the narrow sense and a quick recovery operation of the speed by the operator in a broad sense.

The signal lines preferably are configured with hard-wires or wire-harnesses. The signals can be sent through emitter and detector pairs, infrared radiation, radio waves or the like. The type of signal and the type of connection can be varied between sensors or the same type can be used with all sensors which are described above and will be described below.

In the present system, the ECU 201 also uses a water temperature sensor 358 and an engine body temperature sensor 360. The water and engine body temperature sensors 358, 360 are connected to the ECU 201 through sensor signal lines. The water temperature sensor 358 is disposed at a portion of the engine body 124 such as, for example, the cylinder block 102 to sense a temperature of the cooling water that flows through the water jacket and sends a water temperature signal to the ECU 201. The engine body temperature sensor 360 is also disposed at a portion of the engine body 124 such as, for example, the cylinder block 102, preferably close to the VVT mechanism 40, to sense a temperature of the engine body 124 and to send an engine body temperature signal to the ECU 201. In the illustrated system, these sensors 358, 360 are provided, at least, to sense the water temperature and the engine body temperature, respectively, as a temperature relating to a temperature of the oil within the VVT mechanism 40. Alternatively, an oil temperature sensor which can directly sense an oil temperature of the oil in the VVT mechanism 40 or an oil temperature of the oil in the lubrication system can be provided instead of the sensors 358, 360 or additionally.

Signals from other sensors or control signals also can be used for the control by the ECU 201. In the present control system, various sensors other than the sensors described above are also provided to sense the operational condition of the engine 32 and/or the outboard motor 30. For example, an oil pressure sensor 364, a knock sensor 366, a transmission position sensor 368, an oxygen sensor 370 for determining a current air/fuel ratio, and an intake air temperature sensor 372 are provided in the present control system. The sensors except for the transmission position sensor 368 can sense the operational conditions of the engine 32 and send signals to the ECU 201 through respective sensor signal lines. The transmission position sensor 368 senses whether the transmission 232 (FIG. 1) is placed at the forward, neutral or reverse position and sends a transmission position signal to the ECU 201 through the signal line. An ignition control signal 374 and a fuel injection control signal 376 and an AAD control signal 378 are also used by the ECU 201 for control of the spark plugs 203 (FIG. 2), the fuel injectors 198 and the AAD (not shown), respectively. The foregoing sensors 350–372 and the control signals 374–378, in a broad sense, define sensors 380 that sense operational conditions of the engine and/or the outboard motor.

The ECU 201 can be designed as a feedback control device using the signals of the sensors. The ECU 201 preferably has a central processing unit (CPU) and at least one storage unit which holds various control maps including data regarding parameters such as, for example, the engine speed, the throttle valve position and the intake pressure (and/or an amount of intake air) to determine an optimum control condition at every moment and then controls the VVT mechanism 40, the fuel injectors 198 and other actuators in accordance with the determined control condition.

The ECU 201 can include the fuel injection control unit or module 202 as a hard-wired feed back control circuit, a dedicated processor and memory configured to run one or a plurality of control routines, or a general purpose processor and memory configured to run one or a plurality of control routines. Other units, described below, also are included in the ECU 201 as hard-wired feed back control circuits, a dedicated processors and memory units configured to run one or a plurality of control routines, or general purpose processors and memory units configured to run one or a plurality of control routines. However, for easier understanding of the reader, the units will be described as if they were discriminate and substantial units. The illustrated fuel injection control unit 202 controls the fuel injectors 198 using at least the throttle opening degree signal from the throttle position sensor 354 and the intake pressure signal from the intake pressure sensor 356.

The ECU 201 preferably comprises, other than the fuel injection control unit 202, an actual camshaft angular position calculation (ACAPC) unit 384, an engine speed calculation unit 386, a target camshaft angular position calculation (TCAPC) unit 388, a control value calculation unit 390. The TCAPC unit 388 and the control value calculation unit 390 together form an OCV control section 392 in this ECU configuration.

The ACAPC unit 384 preferably receives the actual camshaft angular position signal from the camshaft angle position sensor 350 and the crankshaft angular position signal, which gives two possible ranges of camshaft angular position, from the crankshaft angle position sensor 352. The ACAPC unit 384 then calculates a deviation value which indicates how much the actual camshaft angular position deviates within the two possible ranges of camshaft angular position.

The engine speed calculation unit 386 receives the crankshaft angular position signal from the crankshaft angle position sensor 352 and calculates an engine speed using the signal versus time.

The TCAPC unit 388 receives the deviation value from the ACAPC unit 384, the engine speed from the engine speed calculation unit 386 and at least the throttle valve opening degree signal from the throttle valve position sensor 354 and the intake pressure signal from the intake pressure sensor 356. The TCAPC unit 388 then calculates a target camshaft angular position based upon the deviation value, the engine speed and either the throttle valve opening degree signal or the intake pressure signal.

The control value calculation unit 390 receives the target camshaft angular position from the TCAPC unit 388 and calculate a control value of the OCV 314 of the VVT mechanism 40. That is, the control value calculation unit 390 determines how much oil is delivered to either the space S1 or the space S2 of the adjusting section 242 of the VVT mechanism 40 based upon the target camshaft angular position.

Under a normal running condition and an ordinary acceleration condition (i.e., not sudden acceleration condition), the ECU 201 preferably uses either a combination of the throttle valve opening degree signal with the engine speed signal (α-N method) or a combination of the intake pressure signal with the engine speed signal (D-j method) to calculate the target camshaft angular position. Otherwise, the ECU 201 can use a mixed combination of the α-N method and the D-j method under the normal running condition or the ordinary acceleration condition. The α-N method, the D-j method and the mixed combination thereof are disclosed in, for example, a co-pending U.S. application filed Feb. 14, 2002, titled CONTROL SYSTEM FOR MARINE ENGINE, which serial number is Ser. No. 10/078,275, the entire contents of which is hereby expressly incorporated by reference. An air amount signal sensed by the air flow meter noted above can be applied additionally or instead either the intake pressure signal or the throttle opening degree signal.

Under sudden acceleration condition, the illustrated ECU 201 preferably uses only the throttle opening degree signal. That is, the ECU 201 determines, at least prior to controlling the OCV 314 with the OCV control section 392, whether the operator wishes sudden acceleration or not. The sudden acceleration condition preferably is determined when a change rate of the throttle opening degree signal, a change rate of the intake pressure signal or a change rate of the engine speed calculated by the engine speed calculation unit 386 becomes greater than a predetermined magnitude. A change rate of the air amount signal also can be used to determine the sudden acceleration condition. Theoretically, the predetermined magnitude can be set at any magnitude larger than zero.

The VVT mechanism 40 operates under a relatively cold condition before the engine 30 is appropriately warmed up. Under this circumstance, the oil supplied to the VVT mechanism 40 has a high viscosity and thus, a response speed of the VVT mechanism 40 under this condition is slower than that under a warmed up condition. The ECU 201 in the present system thus has an control value adjustment unit 400 that adjusts an output of the control value calculation unit 390 until the engine 32 is appropriately warmed up.

Various control strategies can be applied in this adjustment control. For instance, the ECU 201 can use only a signal from the engine body temperature sensor 360. The signal from the engine body temperature sensor 360 can more accurately indicate the engine body temperature than a signal from the water temperature sensor 358. The ECU 201 is configured to sample the output from the engine body temperature sensor 360 and determines if the engine body temperature is lower than a preset temperature. If this is affirmative, the ECU 201 adjusts the output of the control value calculation unit 390.

Of course, the ECU 201 can use the signal from the water temperature sensor 358 under a warmed up condition. In this alternative, the ECU 201 can determine that the water temperature sensor 358 is under an applicable condition by, for example, determining if the engine body temperature exceeds another preset temperature which is higher than the foregoing preset temperature.

Optionally, The ECU 201 can be configured to use only the signal from the water temperature sensor 358. In this modification, the ECU 201 is configured to sample the signal from the water temperature sensor 358 and to determine if the water temperature is lower than a preset temperature. If this is affirmative, the ECU 201 adjusts the output of the control value calculation unit 390. However, the signal from the water temperature sensor 358 may not accurately represent the engine body temperature and/or the oil, particularly before the engine has been completely warmed. Thus, the ECU 201 can be configured to compensate for the inaccuracy through experimentation. For example, further corrected data derived from experiments with specific outboard motors can be stored in the ECU 201. If the ECU 201 uses only the water temperature sensor 358, the engine body temperature sensor 360 can be removed for cost reduction.

Further, the ECU 201 can be configured to use both the signals from the water temperature sensor 358 and the engine body temperature sensor 360. The water temperature and the engine body temperature sensed by the sensors 358, 360, respectively, have a generally predictable interrelation with each other. However, during warm up of the engine 32, the interrelation may not conform to the predicted relationship, because the signal from the water temperature sensor 358 does not always represent the engine body temperature. The ECU 201 can utilize this difference between the signals. For example, the ECU 201 con be configured to sample the signals from the water temperature sensor 358 and the engine body temperature sensor 360 and to determine if the temperatures corresponding to the output signals are different from each other. If this is affirmative, the ECU 201 adjusts the output of the control value calculation unit 390. In this control, a specific value of the water temperature generally is different from a specific value of the engine body temperature. Some adjustment thus is necessary to compare both the specific values with each other.

It is of course possible to detect a temperature of the oil within the VVT mechanism 40 or within the lubrication system sensed by the oil temperature sensor noted above. In this alternative, the ECU 201 adjusts the output of the control value calculation unit 390 when the oil temperature is less than a preset temperature.

FIGS. 9(a), (b), (c) illustrate exemplary adjustment control behaviors.

FIG. 9(a) shows a target camshaft angular position 410 calculated by the TCAPC unit 388 and an actual camshaft angular position 412 sensed by the camshaft angle position sensor 350, both versus time. When the target camshaft angular position 410 is going to move to an advanced position, the adjustment of the camshaft 172 is slower than the target timing 410. Thus, actual camshaft angular position 412 is initially retarded relative to the target camshaft angular position 410 until it catches up with the target camshaft angular position 410 as shown in FIG. 9(a). Although not illustrated, when the target camshaft angular position 410 is going to move to a retarded position, the actual camshaft angular position 412 is initially advanced relative to the target camshaft angular position 410 and then catches up with the target camshaft angular position 410.

FIG. 9(b) illustrates a camshaft angular position deviation 414 between the target and actual camshaft angular positions 410, 412 versus time. The deviation 414 decreases as the actual camshaft angular position 412 approaches the target camshaft angular position 410.

FIG. 9(c) illustrates a normal control characteristic 416 and an adjustment control characteristic 418. Both the characteristics 416, 418 preferably are stored as control maps within the ECU 201. The vertical axis represents the camshaft angular deviation, and the horizontal axis represents a control value of the control value calculation unit 390.

After the engine 32 is warmed up, if the actual camshaft angular position 412 is retarded relative to the target camshaft angular position 410 as shown in FIGS. 9(a), (b), thereby generating a deviation amount, the control value according to the characteristic 416 is advanced relative to a neutral position. If the actual camshaft angular position 412 is advanced relative to the target camshaft angular position 410, thereby generating a deviation amount, the control value is retarded relative to the neutral position.

On the other hand, during warming up of the engine 32, if the actual camshaft angular position 412 is retarded relative to the target camshaft angular position 410 as shown in FIGS. 9(a), (b), the control value according to the characteristic 418, is advanced a greater amount than that dictated by the characteristic 416. If the actual camshaft angular position 412, in turn, is advanced relative to the target camshaft angular position 410, the control value according to the characteristic 418 is retarded a greater amount than that dictated by the characteristic 416.

In the illustrated embodiment, the ECU 201 supplies more electrical power to the solenoid which drives the rod 324 as the control value increases. Thus, when the ECU 201 uses the characteristic 418 to control the solenoid, the rod 324 is positioned so as to provide a larger cross-sectional flow area between the chamber 304 and the ports 306, 308, than that which would be provided according to the characteristic 416. Thus, when the oil is at a low temperature and a higher viscosity, the larger cross-sectional flow area generated by the characteristic 418 can allow the VVT mechanism 40 to respond with approximately the same response time as when the engine 32 is warm and the characteristic 416 is used.

Of course, the foregoing description is that of preferred controls having certain features, aspects and advantages in accordance with the present invention. For instance, the adjustment control characteristic can be calculated by the ECU with a previously provided functional equation rather than being previously provided as a control map. Accordingly, various changes and modifications also may be made to the above-described controls without departing from the spirit and scope of the invention, as defined by the claims.

What is claimed is:

1. A method for controlling an internal combustion engine including an engine body intake and exhaust valves, a valve actuator arranged to actuate the intake and exhaust valves, and a hydraulic change mechanism configured to change an actuating timing of the valve actuator at which the valve actuator actuates at least one of the intake valve and the exhaust valve, the method comprising changing the actuating timing based upon a control characteristic, sensing a first temperature of coolant which cools the engine, sensing a second temperature of the engine body, determining whether the first and second temperatures are substantially different from each other, and adjusting the control characteristic when the determination is affirmative.

2. The method as set forth in claim 1 additionally comprising sensing an actual actuating timing of the valve actuator, controlling the change mechanism to advance the actual timing when the sensed actual timing delays relative to a target timing, and controlling the change mechanism to further advance the actual timing when the determination is affirmative.

3. The method as set forth in claim 1 additionally comprising sensing an actual actuating timing of the valve actuator, controlling the change mechanism to retard the actual timing when the sensed actual timing advances relative to a target timing, and controlling the change mechanism to further retard the actual timing when the determination is affirmative.

4. An internal combustion engine comprising an engine body, the engine body defining a combustion chamber with at least one valve seat, at least one valve configured to move between an open position and a closed position of the valve seat, a valve actuator configured to move the valve between the open and closed positions, a hydraulic adjustment mechanism using an oil as a working fluid and configured to change an actuating timing of the valve actuator at which the valve actuator moves the valve, a temperature sensor configured to sense a temperature of the oil or a temperature relating to the temperature of the oil, a device configured to store a plurality of control characteristics that provides a control value for the adjustment mechanism based on a target timing of the adjustment mechanism, the control characteristics differing from each other by means of temperature, and means for compensating for temperature fluctuations of the oil using one of the control characteristics that accounts for the temperature sensed by the temperature sensor.

5. The engine according to claim 4, wherein the adjustment mechanism comprises an oil supply port, first and second discharge ports, and a second valve configured to control communication between the supply port and the first and second discharge ports.

6. The engine according to claim 5, wherein the adjustment mechanism is further configured to use a pressure of the oil to change a relative angular position of the valve actuator and a crankshaft of the engine.

7. A method for controlling an internal combustion engine comprising actuating an intake or exhaust valve of the engine with a valve actuator, changing an actuating timing of the valve actuator with a hydraulic change mechanism, controlling the change mechanism by a control device, storing a plurality of control characteristics that correlates a control value for the control device with a target timing of the hydraulic chance mechanism, the control characteristics differing from each other by means of temperature, sensing a temperature of oil of the change mechanism or a temperature relating to the temperature of the oil, selecting one of the control characteristics that accounts for the sensed temperature, and controlling the change mechanism with the control device using the selected control characteristic.

8. The method as set forth in claim 7 additionally comprising determining whether the sensed temperature is lower than a preset temperature, the control of the change mechanism using the one of the control characteristics is made when the determination is affirmative.

9. The method as set forth in claim 8 additionally comprising sensing an actual actuating timing of the valve actuator, controlling the change mechanism to advance the actual timing when the sensed actual timing delays relative to a target timing, and controlling the change mechanism to further advance the actual timing when the temperature is lower than a preset temperature.

10. The method as set forth in claim 8 additionally comprising sensing an actual actuating timing of the valve actuator, controlling the change mechanism to retard the actual timing when the sensed actual timing advances relative to a target timing, and controlling the change mechanism to further retard the actual timing when the temperature is lower than a preset temperature.

11. The method as set forth in claim 8 additionally comprising sensing an actual actuating timing of the valve actuator, determining a target timing, determining whether the sensed actual timing delays relative to the target timing, controlling the change mechanism to advance the actual timing when the sensed actual timing delays relative to the target timing, determining whether the sensed temperature is lower than a preset temperature, and controlling the change mechanism to further advance the actual timing when the temperature is lower than the preset temperature.

12. The method as set forth in claim 8 additionally comprising sensing an actual actuating timing of the valve actuator, determining a target timing, determining whether the sensed actual timing advances relative to the target timing, controlling the change mechanism to retard the actual timing when the sensed actual timing advances relative to the target timing, determining whether the sensed temperature is lower than a preset temperature, and controlling the change mechanism to further retard the actual timing when the temperature is lower than the preset temperature.

13. The method as set forth in claim 7 additionally comprising sensing a temperature of coolant which cools the engine to sense the temperature relating to the temperature of the oil.

14. The method as set forth in claim 7 additionally comprising sensing a temperature of an engine body of the engine to sense the temperature relating to the temperature of the oil.

15. The method as set forth in 7 additionally comprising selecting the one of the control characteristics based upon the temperature signal.

16. The method as set forth in claim 7 additionally comprising sensing an actual actuating timing of the valve actuator, determining a target timing of the change mechanism, comparing the actual timing and the target timing with each other, and controlling the change mechanism based upon a result of the comparison.

17. An internal combustion engine comprising an engine body, the engine body defining a combustion chamber with at least one valve seat, at least one valve configured to move between an open position and a closed position of the valve seat, a valve actuator configured to move the valve between the open and closed positions, a hydraulic adjustment mechanism using an oil as a working fluid and configured to change an actuating timing of the valve actuator at which the valve actuator moves the valve, a temperature sensor configured to sense a temperature of the oil or a temperature relating to the temperature of the oil, a timing sensor configured to sense an actual actuating timing of the valve actuator, and a control device configured to control the change mechanism based upon an output of the temperature sensor and an output of the timing sensor, the control device storing a plurality of control characteristics that provides a control value for adjusting the adjustment mechanism based on a target position of the adjustment mechanism, the control characteristics differing from each other by means of temperature, the control device determining the target position of the change mechanism and comparing the output of the timing sensor and the target timing with each other, the control device retarding or advancing the actuating timing such that the output of the timing sensor is generally consistent with the target position using one of the control characteristics, the control device further retarding or advancing the actuating timing, respectively, using another one of the control characteristics when the output of the temperature sensor indicates that the temperature is lower than a preset temperature.

18. An internal combustion engine for a marine drive comprising an engine body, a movable member movable relative to the engine body, the engine body and the movable member together defining a combustion chamber, the engine body defining intake and exhaust ports communicating with the combustion chamber, an air induction system communicating with the combustion chamber through the intake port, an exhaust system communicating with the combustion chamber through the exhaust port, an intake valve arrange to move between an open position and a closed position of the intake port, an exhaust valve arranged to move between an open position and a closed position of the exhaust port, a valve actuator arranged to actuate either the intake valve or the exhaust valve, a hydraulic change mechanism arranged to change an actuating timing of the valve actuator at which the valve actuator actuates the intake valve or the exhaust valve, a control device configured to control the change mechanism based upon a control characteristic, the engine body defining a coolant jacket through which coolant flows, a first temperature sensor configured to sense a temperature of the coolant and to send a first temperature signal to the control device, and a second temperature sensor configured to sense a temperature of the engine body and to send a second temperature signal to the control device, the control device being configured to adjust the control characteristic when the first and second temperature signals sensed by the first and second temperature sensors, respectively, are substantially different from each other.

19. The engine as set forth in claim 18 additionally comprising a timing sensor configured to sense an actual actuating timing of the valve actuator and to send an actual timing signal to the control device, the control device being configured to determine a target change timing of the change mechanism, the control device being configured to control the change mechanism to advance the actual timing when the actual timing delays relative to the target change timing, the control device being configured to control the change mechanism to further advance the actual timing when the first and second temperature signals are substantially different from each other.

20. The engine as set forth in claim 18 additionally comprising a timing sensor configured to sense an actual actuating timing of the valve actuator and to send an actual timing signal to the control device, the control device being configured to determine a target change timing of the change mechanism, the control device being configured to control the change mechanism to retard the actual timing when the actual timing advances relative to the target change timing, and the control device being configured to control the change mechanism to further retard the actual timing when the first and second temperature signals are substantially different from each other.

21. An internal combustion engine comprising an engine body, a movable member movable relative to the engine body, the engine body and the movable member together defining a combustion chamber, the engine body defining intake and exhaust ports communicating with the combustion chamber, an air induction system communicating with the combustion chamber through the intake port, an exhaust system communicating with the combustion chamber through the exhaust port, an intake valve configured to move between an open position and a closed position of the intake port, an exhaust valve arranged to move between an open position and a closed position of the exhaust port, a valve actuator arranged to actuate either the intake valve or the exhaust valve, a hydraulic change mechanism arranged to change an actuating timing of the valve actuator at which the valve actuator actuates the intake valve or the exhaust valve, a control device configured to control the change mechanism, the control device storing a plurality of control characteristics each of which provide a correspondence between a control value for control of the change mechanism versus a target timing of the valve actuator, the control characteristics differing from each other by means of temperature, and a temperature sensor configured to sense a temperature of oil of the change mechanism or a temperature relating to the temperature of the oil and to send a temperature signal to the control device, the control device selecting one of the control characteristics that accounts for the temperature sensed by the temperature sensor to control the change mechanism.

22. The engine as set forth in claim 21, wherein the control device uses said one of the control characteristics when the temperature is lower than a preset temperature.

23. The engine as set forth in claim 22 additionally comprising a timing sensor configured to sense an actual actuating timing of the valve actuator and to send an actual timing signal to the control device, the control device determines a target change timing of the change mechanism, the control device controls the change mechanism to retard the actual timing when the actual timing advances relative to the target change timing, and the control device controls the change mechanism to further retard the actual timing when the temperature is lower than a preset temperature.

24. The engine as set forth in claim 22, wherein the temperature sensor is configured to sense a temperature of the engine body.

25. The engine as set forth in claim 22, wherein the engine body defines a coolant jacket through which a coolant flows, the temperature sensor being configured to sense a temperature of the coolant.

26. The engine as set forth in claim 25, wherein the engine is incorporated in a marine drive, the coolant includes water introduced from a location outside of the marine drive and discharged to the location.

27. The engine as set forth in claim 22 additionally comprising a timing sensor configured to sense an actual actuating timing of the valve actuator and to send an actual timing signal to the control device, the control device determines a target change timing of the change mechanism, the control device controls the change mechanism to advance the actual timing when the actual timing delays relative to the target change timing, and the control device controls the change mechanism to further advance the actual timing when the temperature is lower than the preset temperature.

28. The engine as set forth in claim 21 additionally comprising a timing sensor configured to sense an actual actuating timing of the valve actuator and to send an actual timing signal to the control device, the control device determines a target change timing of the change mechanism and compares the actual actuating timing and the target change timing with each other, the control device controls the change mechanism along at least two of the control characteristics based upon a result of the comparison, said at least two of the control characteristics including said one of the control characteristic.

29. The engine as set forth in claim 28, wherein said one of the control characteristics provides a further retarded or advanced position when another one of the control characteristics provides a retarded or advanced position, respectively, the control device controls the change mechanism using said one of the control characteristics when the temperature is lower than a preset temperature.

30. The engine as set forth in claim 21, wherein the temperature sensor is configured to sense a temperature of the engine body.

31. The engine as set forth in claim 21, wherein the engine body defines a coolant jacket through which a coolant flows, the temperature sensor being configured to sense a temperature of the coolant.

32. The engine as set forth in claim 21 additionally comprising a crankshaft journaled for rotation at least partially within the engine body, wherein the valve actuator includes a camshaft journaled on the engine body for rotation, the camshaft including a cam lobe configured to actuate the intake or exhaust valve, the change mechanism being configured to change an angular position of the camshaft relative to the crankshaft.

33. The engine as set forth in claim 21, wherein the control device selects the one of the control characteristics based upon the temperature signal.

* * * * *

UNITED STATES PATENT AND TRADEMARK OFFICE
CERTIFICATE OF CORRECTION

| | | |
|---|---|---|
| PATENT NO. | : 6,957,635 B2 | Page 1 of 1 |
| APPLICATION NO. | : 10/188772 | |
| DATED | : October 25, 2005 | |
| INVENTOR(S) | : Goichi Katayama | |

It is certified that error appears in the above-identified patent and that said Letters Patent is hereby corrected as shown below:

At column 14, line 47, after "is" please delete "Ser. No.".

At column 17, line 63, after "is" please delete "Ser. No.".

At column 18, line 21, please delete "an" and insert -- a --, therefor.

At column 21, line 17, in Claim 7, please delete "chance" and insert -- change --, therefor.

At column 22, line 5, in Claim 15, please delete "7" and insert -- claim 7 --, therefor.

At column 22, line 52, in Claim 18, please delete "arrange" and insert -- arranged --, therefor.

Signed and Sealed this

Twentieth Day of May, 2008

JON W. DUDAS
*Director of the United States Patent and Trademark Office*